US012604255B2

(12) United States Patent
Ahmavaara et al.

(10) Patent No.: US 12,604,255 B2
(45) Date of Patent: Apr. 14, 2026

(54) COUPLING MULTIPLE HIGHER-LAYER RADIO ACCESS NETWORK (RAN) ENTITIES TO A SHARED REMOTE UNIT(S) (RU(S)) IN A RAN SYSTEM

(71) Applicant: Corning Research & Development Corporation, Corning, NY (US)

(72) Inventors: Kalle Ahmavaara, Los Angeles, CA (US); Ido Haviv, Ramat Gan (IL); Yuri Ratner, Ashdod (IL); Roni Aharon Shurki, Modiin (IL)

(73) Assignee: ANI Acquisition Sub, LLC, Boca Raton, FL (US)

( * ) Notice: Subject to any disclaimer, the term of this patent is extended or adjusted under 35 U.S.C. 154(b) by 162 days.

(21) Appl. No.: 18/126,607

(22) Filed: Mar. 27, 2023

(65) Prior Publication Data

US 2024/0334305 A1 Oct. 3, 2024

(51) Int. Cl.
*H04W 40/24* (2009.01)

(52) U.S. Cl.
CPC ................................. *H04W 40/246* (2013.01)

(58) Field of Classification Search
CPC .................................................... H04W 40/246
See application file for complete search history.

(56) References Cited

U.S. PATENT DOCUMENTS

2022/0361025 A1* 11/2022 Bachu ................... H04W 28/18

\* cited by examiner

*Primary Examiner* — Jamal Javaid
(74) *Attorney, Agent, or Firm* — Greenberg Traurig, LLP; Mammen (Roy) P. Zachariah

(57) ABSTRACT

Coupling multiple higher-layer radio access network (RAN) entities to a shared remote unit(s) (RU(s)) in an Open RAN (O-RAN) system and related methods and computer-readable media. To provide for a distribution unit (DU) of a RAN and its shared RUs to communicate signals to each other transparently as if the shared RU was dedicated to such DU, the RAN system includes a neutral host agent device. The neutral host agent device is communicatively coupled between one or more DUs of one or more RANs and their shared RU(s). The neutral host agent device is configured to support coordination and management of communications between RAN(s) and a shared RU(s). In this manner, the shared RU(s) do not have to be implemented in a customized fashion to handle and coordinate communications between the RAN(s) and user devices according to the RAN standard that does not support shared RU(s).

26 Claims, 19 Drawing Sheets

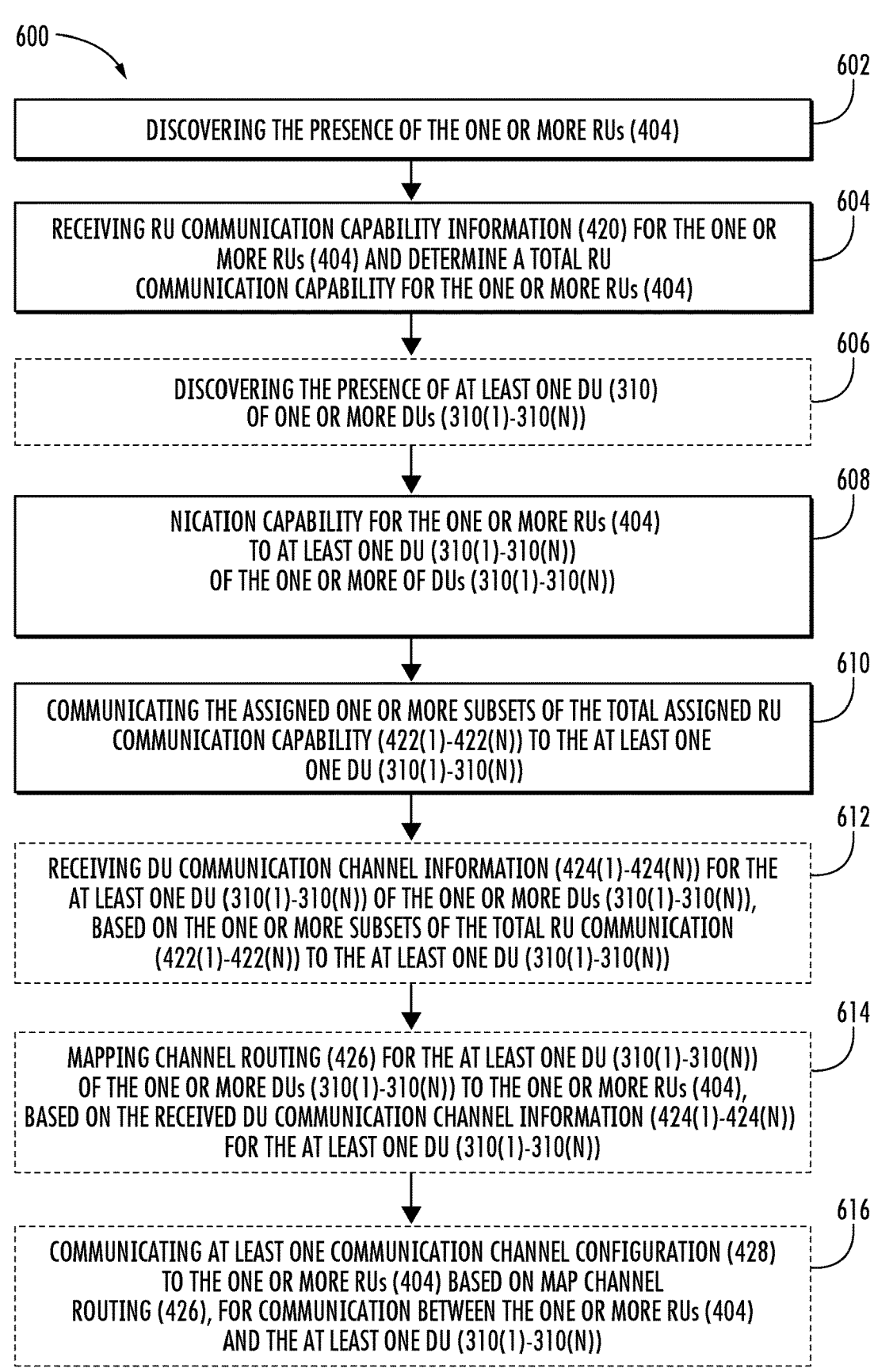

600

DISCOVERING THE PRESENCE OF THE ONE OR MORE RUs (404)                    602

RECEIVING RU COMMUNICATION CAPABILITY INFORMATION (420) FOR THE ONE OR
MORE RUs (404) AND DETERMINE A TOTAL RU
COMMUNICATION CAPABILITY FOR THE ONE OR MORE RUs (404)                   604

DISCOVERING THE PRESENCE OF AT LEAST ONE DU (310)
OF ONE OR MORE DUs (310(1)-310(N))                                       606

NICATION CAPABILITY FOR THE ONE OR MORE RUs (404)
TO AT LEAST ONE DU (310(1)-310(N))
OF THE ONE OR MORE OF DUs (310(1)-310(N))                                608

COMMUNICATING THE ASSIGNED ONE OR MORE SUBSETS OF THE TOTAL ASSIGNED RU
COMMUNICATION CAPABILITY (422(1)-422(N)) TO THE AT LEAST ONE
ONE DU (310(1)-310(N))                                                   610

RECEIVING DU COMMUNICATION CHANNEL INFORMATION (424(1)-424(N)) FOR THE
AT LEAST ONE DU (310(1)-310(N)) OF THE ONE OR MORE DUs (310(1)-310(N)),
BASED ON THE ONE OR MORE SUBSETS OF THE TOTAL RU COMMUNICATION
(422(1)-422(N)) TO THE AT LEAST ONE DU (310(1)-310(N))                   612

MAPPING CHANNEL ROUTING (426) FOR THE AT LEAST ONE DU (310(1)-310(N))
OF THE ONE OR MORE DUs (310(1)-310(N)) TO THE ONE OR MORE RUs (404),
BASED ON THE RECEIVED DU COMMUNICATION CHANNEL INFORMATION (424(1)-424(N))
FOR THE AT LEAST ONE DU (310(1)-310(N))                                  614

COMMUNICATING AT LEAST ONE COMMUNICATION CHANNEL CONFIGURATION (428)
TO THE ONE OR MORE RUs (404) BASED ON MAP CHANNEL
ROUTING (426), FOR COMMUNICATION BETWEEN THE ONE OR MORE RUs (404)
AND THE AT LEAST ONE DU (310(1)-310(N))                                  616

| TYPE OF DATA | ORIGINATED AT | DESTINATION | GOES THROUGH THE NETWORK SWITCH (1102)? |
|---|---|---|---|
| C/U PLANE DL | DU (310) | GW (1104) | YES |
| C/U PLANE DL | FW (1104) | O-RU's (404) | YES |
| U PLANE UL | O-RU's (404) | GW (1104) | YES |
| U PLANE UL | GW (1104) | DU (310) | YES |
| M-PLANE | DU (310) | GW (1104) | YES |
| M-PLANE | NH AGENT (1104, 1118) | O-RU (404) | YES |
| S-PLANE | GM (1106) | O-RU's (404), DU (310) | YES |

1500

| | INITIATED | THROUGH | DESTINATION |
|---|---|---|---|
| C/U PLANE DL | DU (310) | - | GW (1104) |
| C/U PLANE DL | GW (1104) | NET SW (1102) | ORU's (404) |
| U PLANE UL | O-RU's (404) | NET SW (1102) | GW (1104) |
| U PLANE UL | GW (1104) | - | DU (310) |
| M-PLANE | DU (310) | - | GW (1104) |
| M-PLANE | GW-NH AGENT (1104, 1118) | NET SW (1102) | O-RU's (404) |
| S-PLANE | GM (1106) | NET SW (1102) | O-RU's (404), DU's (310) |

PROCESSING CIRCUIT
1902

INSTRUCTIONS
1916

1908

COMPUTER READABLE MEDIUM
1918

INSTRUCTIONS
1916

MAIN MEMORY
1904

INSTRUCTIONS
1916

INPUT
1912

STATIC MEMORY
1906

OUTPUT
1914

NETWORK INTERFACE DEVICE
1910

NETWORK
1920

COUPLING MULTIPLE HIGHER-LAYER RADIO ACCESS NETWORK (RAN) ENTITIES TO A SHARED REMOTE UNIT(S) (RU(S)) IN A RAN SYSTEM

BACKGROUND

This disclosure relates generally to mobile communications systems and related networks, such as Universal Mobile Telecommunications Systems (UMTSs), its offspring Long Term Evolution (LTE) and $5^{th}$ Generation New Radio (5G-NR) described and being developed by the Third Generation Partnership Project (3GPP), and more particularly to radio access networks (RANs) and user mobile communication devices connecting thereto, including small cell RANs, implemented in such mobile communications systems.

Wireless communications are rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Communications systems have been provided to transmit and/or distribute communications signals to wireless devices called "clients," "client devices," or "wireless client devices," which must reside within the wireless range or "cell coverage area" in order to communicate with an access point device. Examples of applications where communications systems can provide or enhance coverage for wireless services include public safety, cellular telephony, wireless local access networks (LANs), location tracking, and medical telemetry inside buildings and over campuses. One approach to deploying a communications system involves the use of a radio node/base station that transmits communications signals distributed over physical communications medium remote unit forming radio frequency (RF) antenna coverage areas, also referred to as "antenna coverage areas." The remote units each contain or are configured to couple to one or more antennas configured to support the desired frequency(ies) of the radio node to provide the antenna coverage areas. Antenna coverage areas can have a radius in the range from a few meters up to twenty meters, as an example. Another example of a communications system includes radio nodes, such as base stations, that form cell radio access networks, wherein the radio nodes are configured to transmit communications signals wirelessly directly to client devices without being distributed through intermediate remote units.

Operators of mobile systems, such as UMTSs and its offspring, including LTE and LTE-Advanced, are increasingly relying on wireless small cell RANs in order to deploy, for example, indoor voice and data services to enterprises and other customers. Such small cell RANs typically utilize multiple-access technologies capable of supporting communications with multiple users using RF signals and sharing available system resources such as bandwidth and transmit power. Evolved universal terrestrial radio access (E-UTRA) is the radio interface of 3GPP's LTE upgrade path for UMTS mobile networks. In these systems, there are different frequencies where LTE (or E-UTRA) can be used, and in such systems, user mobile communications devices connect to a serving system, which is represented by a cell. In LTE, each cell is produced by a node called eNodeB (eNB). A gNodeB (gNB) is a node in a cellular network that provides connectivity between user equipment (UE) and the evolved packet core (EPC).

For example, FIG. 1 is an example of a wireless communications system (WCS) 100 that includes a radio node 102 configured to support one or more service providers $SP_1$-$SP_N$, 104(1)-104(N) as signal sources (also known as "carriers" or "service operators"—e.g., mobile network operator (MNO)) and wireless client devices 106(1)-106(W). For example, the radio node 102 in the WCS 100 in FIG. 1 can be a small cell RAN ("small cell RAN") that is configured to support multiple service providers 104(1)-104(N) by distributing a communications signal stream 108(1)-108(S) for the multiple service providers 104(1)-104(N). The distributed communications signal stream 108(1)-108(S) may be received from a base station (e.g., eNB or gNB) or respective evolved packet cores (EPC) network $CN_1$-$CN_N$ of the service provider 104(1)-104(N) through interface connections. Small cells can support one or more service providers in different channels within a frequency band to avoid interference and reduced signal quality as a result. Secure communications tunnels are formed between the wireless client devices 106(1)-106(W) and the respective service provider 104(1)-104(N). Thus, in this example, the radio node 102 essentially appears as a single node (e.g., eNB in 4G or gNB in 5G) to the service provider 104(1)-104(N).

Open-RAN (O-RAN) is a set of specifications that specifies multiple options for functional divisions of a cellular base station between physical units, and it also specifies the interface between these units. An example for a possible division specified by O-RAN is in the O-RANs 200, 202 shown in FIGS. 2A and 2B, respectively. In the O-RANs 200, 202, the functionality of the base station (e.g., gNB, as called in the context of 5G) is divided into three functional units of an O-RAN central unit (O-CU) 204, an O-RAN distribution unit (O-DU) 206, and one or more O-RAN remote units (O-RUs) 208(1)-208(N). These components may run on different hardware platforms and reside at different locations. The O-RUs 208(1)-208(N) include the lowest layers of the base station, and it is the entity that wirelessly transmits and receives signals to user devices. The O-CU 204 includes the highest layers of the base station and is coupled to a "core network" of the cellular service provider. The O-DU 206 includes the middle layers of the base station to provide support for a single cellular service provider (also known as operator or carrier). An F1 interface 210 is connected between the O-CU 204 and the O-DU 206. An eCPRI/O-RAN fronthaul interface 212 connects the O-DU 206 and an O-RU 208. The F1 interface 210 and eCPRI/O-RAN fronthaul interface 212 use Ethernet protocol for conveying the data in this example. Therefore, Ethernet switches (not shown in FIGS. 2A and 2B) may exist between the O-CU 204 and the O-DU 206 and between the O-DU 206 and the O-RU 208.

Each O-DU 206 can also be coupled to a single or to a cluster of O-RUs 208(1)-208(N) that serve signals of the one or more "cells" of the O-DU 206. A "cell" in this context is a set of signals intended to serve subscriber units (e.g., cellular devices) in a certain area. Multiple O-RUs 208(1)-208(N) are supported in the O-RAN by what is referred to as a "Shared-Cell." Shared Cell is realized by a front-haul multiplexer (FHM) 214, placed between the O-DU 206 and the O-RUs 208(1)-208(N). The FHM 214 de-multiplexes signals from the O-DU 206 to the plurality of O-RUs 208(1)-208(N) and multiplexes signals from the plurality of O-RUs 208(1)-208(N) to O-DU 206. The FHM 214 can be considered as an O-RU with fronthaul support and additional copy-and-combine function but lacks the RF front-end capability. The O-RAN 200 in FIG. 2A shows the O-RUs 208(1)-208(N) supporting the same cell (#1). The O-RAN 202 in FIG. 2B shows each O-RU 208(1)-208(N) supporting the different cell (#1 . . . #M). In each case of the O-RANs 200, 202 in FIGS. 2A and 2B, and the O-DU 206 provide support for a single cellular service provider to provide cell services to the plurality of O-RUs 208(1)-208(N).

No admission is made that any reference cited herein constitutes prior art. Applicant expressly reserves the right to challenge the accuracy and pertinency of any cited documents.

SUMMARY

Embodiments disclosed herein include coupling multiple higher-layer radio access network (RAN) entities to a shared remote unit(s) (RU(s)) in a RAN system. Related methods and computer-readable media are also disclosed. For example, the RAN system may be an Open-RAN (O-RAN) system that includes one or more RANs that are compatible with the Open RAN standard set forth by the O-RAN Alliance and referred to herein as an "O-RAN system." The O-RAN system can include one or more RANs that each include a macrocell radio access network(s) (RANs) and/or a small cell RAN(s) as exemplary types of RANs. In exemplary embodiments, the RAN system includes one or more RANs that each provide a base station to provide a cell, which includes a set of signals intended to serve subscriber units (e.g., cellular devices) in a certain coverage area. For example, each RAN can include a RAN central unit (CU), a RAN distribution unit (DU), and one or more remote units (RUs). The RU(s) can include the lowest layers of a base station, and it is the entity that wirelessly transmits and receives signals to user devices. The CU can include the highest layers of the base station and can be configured to be coupled to a "core network" of the cellular service provider (also known as operator or carrier). The DU can include middle layers of the base station to provide support for a single cellular service provider. One or more RANs in the RAN system are configured to share one or more RUs that serve signals for one or more cells of its coupled RAN(s). The one or more shared RUs may include a single shared RU or may include shared clusters of RUs. A benefit of one or more RANs sharing a RU is that the shared RU can serve the multiple service providers of the RAN(s), each employing its own separate CU and DU.

In exemplary aspects, the RAN system includes a neutral host agent device to provide for the ability of DU of a RAN and its shared RU(s) to be able to communicate information and signals to each other transparently according to a RAN standard (e.g., the O-RAN standard) as if the shared RU was dedicated to such DU. The neutral host agent device is communicatively coupled between one or more DU of one or more RANs and their shared RU(s). The neutral host agent device is configured to provide support for the coordination and management of communications (e.g., in communications planes) between the RAN(s) and the shared RU(s) that are otherwise not supported by a RAN standard. In this manner, the shared RU(s) does not have to be designed and implemented in a customized fashion with functionality not included in the RAN standard implemented by the RAN system in order to handle and coordinate communications for the RAN(s) to its user devices, and vice versa. Thus, in an example, the neutral host agent device also allows a legacy RU(s) that is compatible with the RAN standard of the RAN system to be shared by a RAN(s) without having to be customized and/or replaced.

One exemplary embodiment of the disclosure relates to a host agent device. The host agent device comprises a controller configured to be communicatively coupled to one or more remote units (RUs) and one or more distribution units (DUs), each DU of the one or more DUs included in a radio access network (RAN) among one or more RANs. The controller is configured to discover the presence of one or more RUs. The controller is also configured to receive RU communication capability information for the one or more RUs. The controller is also configured to determine a total RU communication capability based on the received RU communication capability information for the one or more RUs. The controller is also configured to assign one or more subsets of the total RU communication capability to at least one DU of the one or more DUs. The controller is also configured to communicate the assigned one or more subsets of the total RU communication capability to the at least one DU.

An additional exemplary embodiment of the disclosure relates to a method of coupling a plurality of distribution units (DUs) in one or more respective radio access networks (RANs) to at least one shared remote unit (RU) of one or more RUs. The method comprises discovering the presence of the one or more RUs. The method also comprises receiving RU communication capability information for the one or more RUs. The method also comprises determining a total RU communication capability based on the received RU communication capability information for the one or more RUs. The method also comprises assigning one or more subsets of the total RU communication capability to at least one DU of the one or more DUs. The method also comprises communicating the assigned one or more subsets of the total RU communication capability to the at least one DU.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding and are incorporated in and constitute a part of this specification. The drawings illustrate one or more embodiment(s) and, together with the description, serve to explain principles and operation of the various embodiments.

BRIEF DESCRIPTION OF THE DRAWINGS

FIG. 6 is a flowchart illustrating an exemplary process of the neutral host agent device in FIG. 4 discovering and setting up communication channels for interfacing a shared RU(s) to a plurality of DUs among the multiple RANs;

FIG. 15 is a table illustrating an exemplary routing scheme for different types of data communicated with the ORUs and the DUs in the O-RANs in FIG. 14;

DETAILED DESCRIPTION

Embodiments disclosed herein include coupling multiple higher-layer radio access network (RAN) entities to a shared remote unit(s) (RU(s)) in a RAN system. Related methods and computer-readable media are also disclosed. For example, the RAN system may be an Open-RAN (O-RAN) system that includes one or more RANs that are compatible with the Open RAN standard set forth by the O-RAN Alliance and referred to herein as an "O-RAN system." The O-RAN system can include one or more RANs that each include a macrocell radio access network(s) (RANs) and/or a small cell RAN(s) as exemplary types of RANs. In exemplary embodiments, the RAN system includes one or more RANs that each provide a base station to provide a cell, which includes a set of signals intended to serve subscriber units (e.g., cellular devices) in a certain coverage area. For example, each RAN can include a RAN central unit (CU), a RAN distribution unit (DU), and one or more remote units (RUs). The RU(s) can include the lowest layers of a base station, and it is the entity that wirelessly transmits and receives signals to user devices. The CU can include the highest layers of the base station and can be configured to be coupled to a "core network" of the cellular service provider (also known as operator or carrier). The DU can include middle layers of the base station to provide support for a single cellular service provider. One or more RANs in the RAN system are configured to share one or more RUs that serve signals for one or more cells of its coupled RAN(s). The one or more shared RUs may include a single shared RU or may include shared clusters of RUs. A benefit of one or more RANs sharing a RU is that the shared RU can serve the multiple service providers of the RAN(s), each employing its own separate CU and DU.

In exemplary aspects, the RAN system includes a neutral host agent device to provide for the ability of DU of a RAN and its shared RU(s) to be able to communicate information and signals to each other transparently according to a RAN standard (e.g., the O-RAN standard) as if the shared RU was dedicated to such DU. The neutral host agent device is communicatively coupled between one or more DU of one or more RANs and their shared RU(s). The neutral host agent device is configured to provide support for the coordination and management of communications (e.g., in communications planes) between the RAN(s) and the shared RU(s) that are otherwise not supported by a RAN standard. In this manner, the shared RU(s) does not have to be designed and implemented in a customized fashion with functionality not included in the RAN standard implemented by the RAN system in order to handle and coordinate communications for the RAN(s) to its user devices, and vice versa. Thus, in an example, the neutral host agent device also allows a legacy RU(s) that is compatible with the RAN standard of the RAN system to be shared by a RAN(s) without having to be customized and/or replaced.

Figure 1:
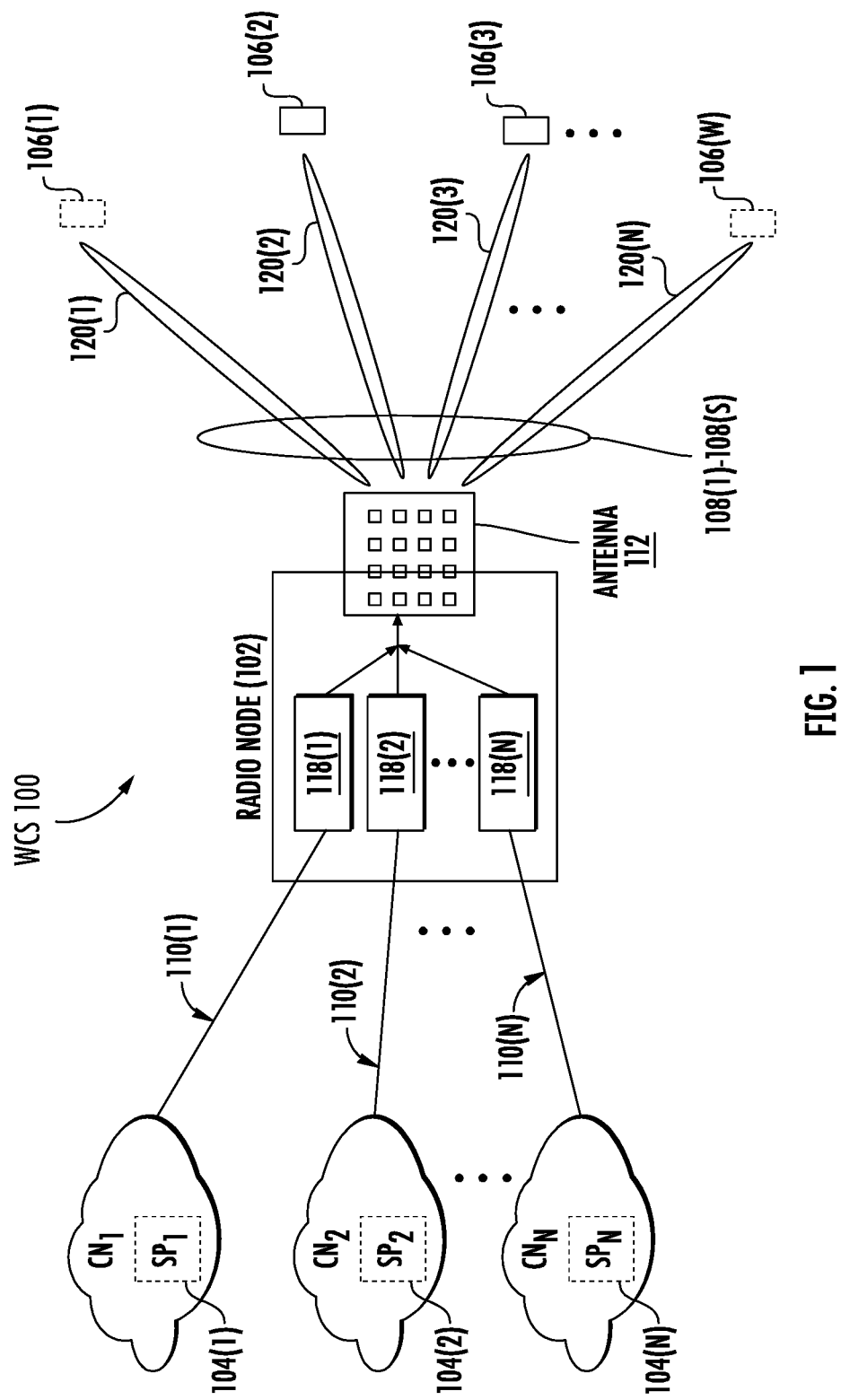
FIG. 1 is a schematic diagram of an exemplary Radio Access Network (RAN) that includes a conventional single-operator radio node that includes a massive antenna array (MAA) to support distribution of communications signals to a user device.
Figures 2A, 2B:
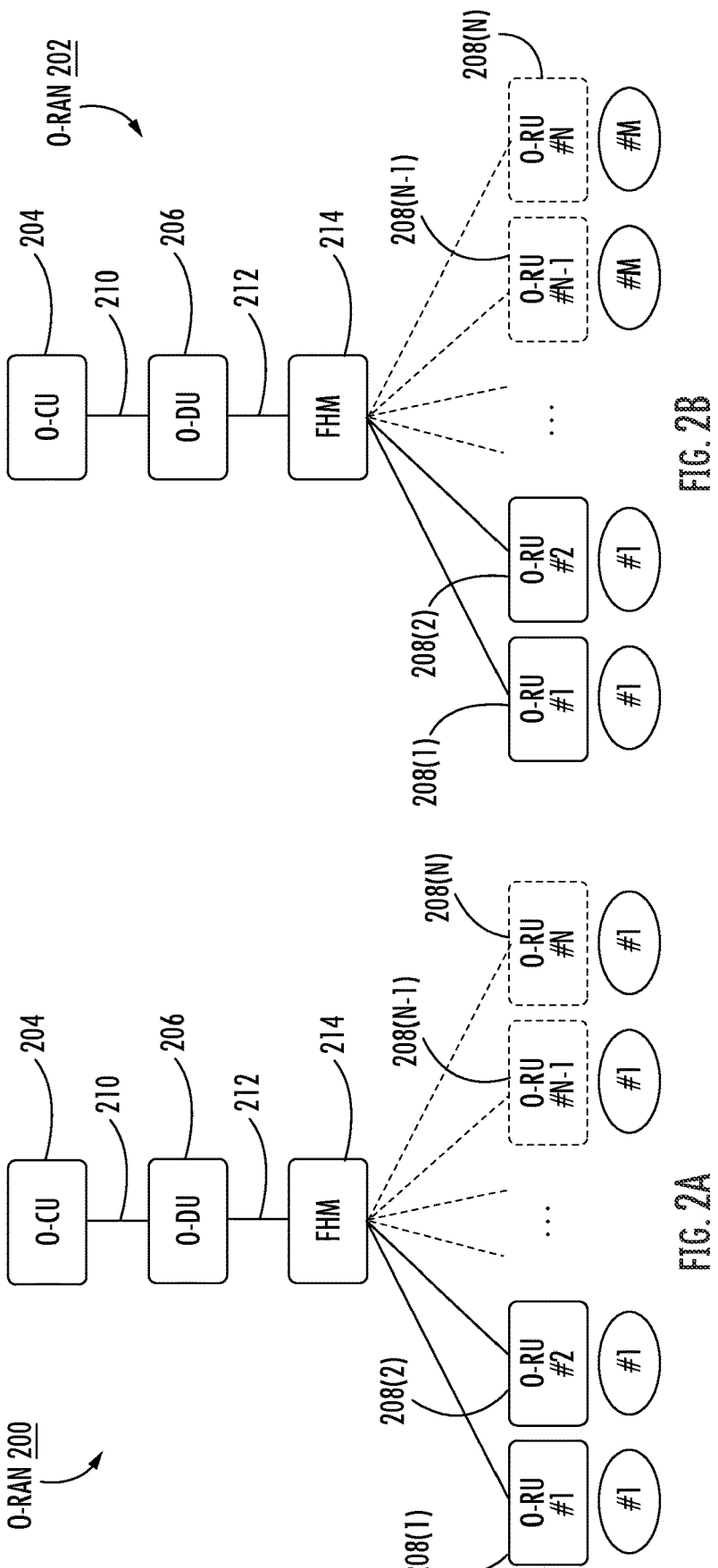
FIGS. 2A and 2B are examples of Open-standard RANs (O-RANs)
Figure 3:
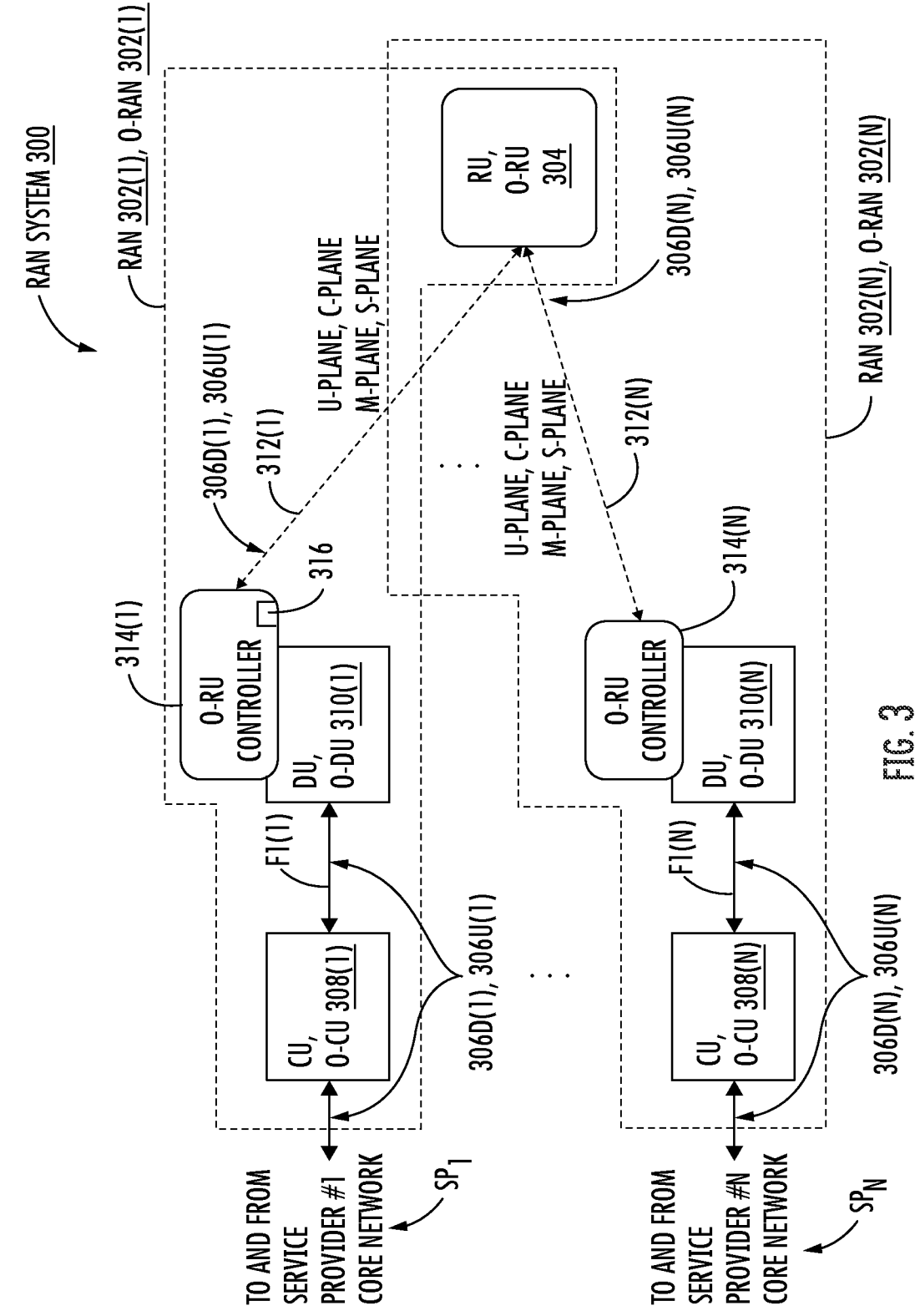
FIG. 3 is an exemplary RAN system that includes multiple O-RANs that are configured to support different service providers and that are each configured to directly interface with a shared modified Open-standard remote unit (O-RU)
Figure 4:
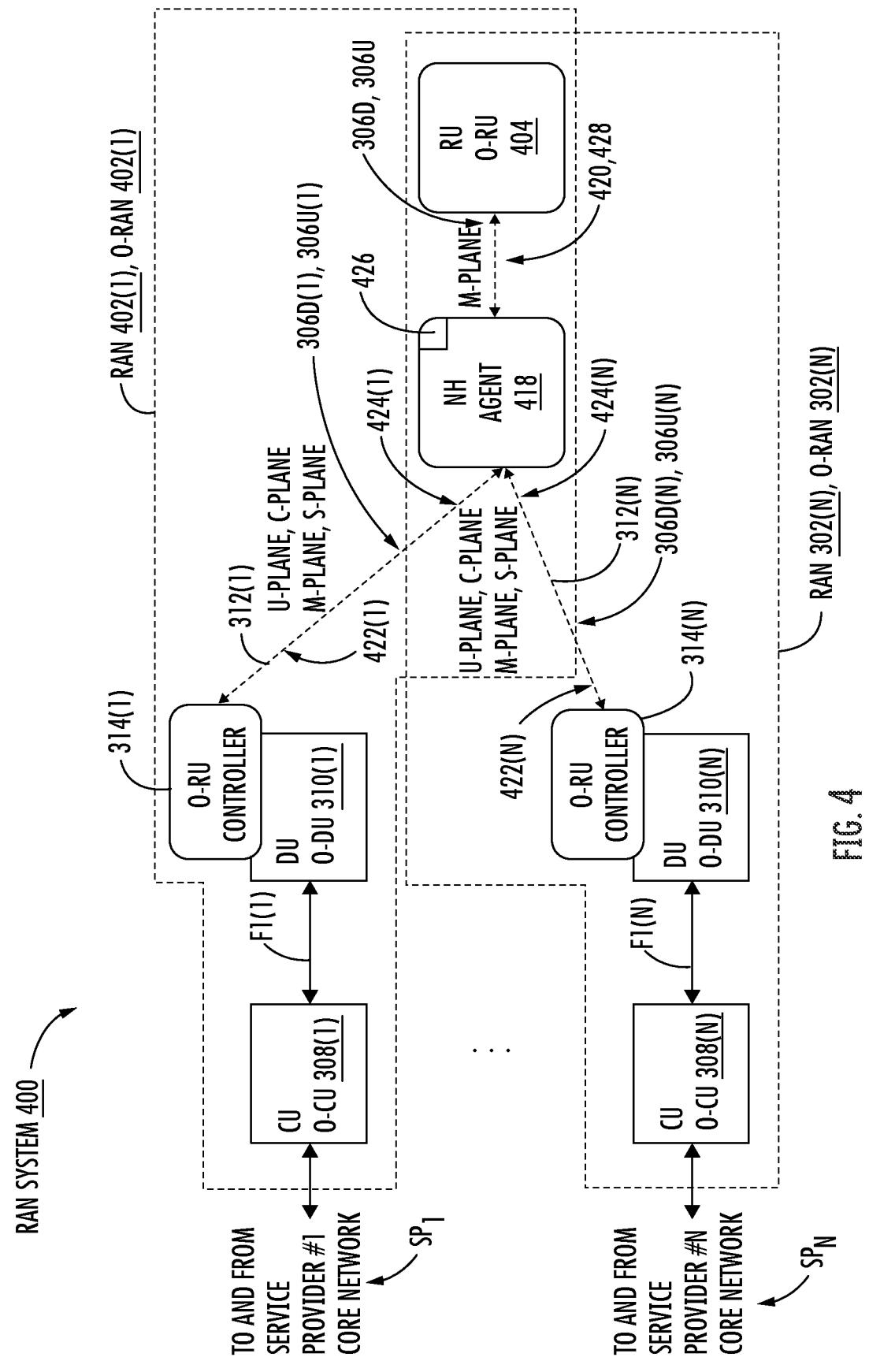
FIG. 4 is an exemplary RAN system that includes multiple RANs (e.g., O-RANs) implemented according to a RAN standard (e.g., O-RAN standard), wherein each RAN is configured to support a different service provider, and wherein each RAN has a distribution unit (DU) configured to interface with a shared remote unit (RU) through an intermediary neutral host agent device that has a transparent interface to the DUs and shared RU.

Example RAN systems that include multiple higher-layer RAN entities configured to access a shared RU through an intermediate neutral host agent device to maintain legacy interfaces to RUs that are compatible with the RAN standard of the RAN system, start at FIG. 4. However, before discussing such RAN systems, an exemplary RAN system that includes multiple higher-layer RAN entities configured to a shared RU without an intermediate agent device such that the shared RU includes a modified interface to be able to interface with the multiple higher-layer RAN entities is first described with regard to FIG. 3 below.

In this regard, FIG. 3 is an exemplary RAN system 300 that includes multiple RANs 302(1)-302(N), each configured to support different service providers that are each configured to directly interface with a shared modified RU 304, wherein 'N' can be any positive whole number to signify the number of RANs. For example, the RANs 302(1)-302(N) may be O-RANs that are compatible with the Open-RAN standard set forth by the O-RAN Alliance, found at https://www.o-ran.org/. O-RAN is a set of specifications that specifies multiple options for functional divisions of a cellular base station between physical units and it also specifies the interface between these units. As an example, RANs 302(1)-302(N) can be small cell RANs that are configured to support multiple service providers $SP_1$-$SP_N$ by distributing downlink communications signals 306D(1)-306D(N) (e.g., communication channels) for the multiple service providers $SP_1$-$SP_N$. The RANs 302(1)-302(N) both include a shared RU 304 that is configured to support one or more service providers $SP_1$-$SP_N$ as signal sources (also known as "carriers" or "service operators"—e.g., mobile network operator (MNO). In this manner, the multiple RANs 302(1)-302(N) can share access to the RU 304 as opposed to each RAN 302(1)-302(N) having to include its own dedicated RUs. Providing for the ability of the RU 304 to be shared between the multiple RANs 302(1)-302(N) may be efficient in terms of cost and area, as it may be desired to provide antenna coverage for the multiple service providers $SP_1$-$SP_N$ in the same physical location and area. The shared RU 304 is configured to wirelessly distribute the received downlink communications signals 306D(1)-306D(N) (e.g., in the form of communication channels) received from the respective service providers $SP_1$-$SP_N$, distributed by respective O-RAN Central Units (O-CUs) 308(1)-308(N) and O-RAN Distribution Units (O-DUs) 310(1)-310(N), to user client devices in the reception range of the RU 304. The shared RU 304 can include the lowest layers of a base station, and it is the entity that wirelessly transmits and receives signals to user devices. The O-CUs 308(1)-308(N) can include the highest layers of the base station and can be configured to be coupled to a "core network" of a respective cellular service provider $SP_1$-$SP_N$ (also known as operator or carrier). The DUs 310(1)-310(N) can include middle layers of the base station to provide support for a respective cellular service provider $SP_1$-$SP_N$.

The downlink communications signals 306D(1)-306D(N) may be received from a base station (e.g., an eNB or gNB) or respective evolved packet cores (EPC) network of the respective service providers $SP_1$-$SP_N$ through interface connections. Small cells can support one or more service providers in different channels within a frequency band to avoid interference and reduced signal quality as a result. The shared RU 304 is also configured to receive uplink communications signals 306U(1)-306U(N) (e.g., in the form of uplink communication channels) wirelessly received from user devices. The shared RU 304 is configured to distribute such received uplink communications signals 306U(1)-306U(N) to the respective service providers $SP_1$-$SP_N$ through the respective O-DUs 310(1)-310(N) and O-CUs 308(1)-308(N). Secure communications tunnels are formed between the RU 304 and the respective service providers $SP_1$-$SP_N$. Thus, in this example, the RANs 302(1)-302(N) essentially appear as a single node (e.g., eNB in 4G or gNB in 5G) to the respective service providers $SP_1$-$SP_N$.

As discussed above, the RAN 302(1)-302(N) in the RAN system 300 may be O-RANs that are compatible with the O-RAN standard and thus are referred to as O-RANs 302(1)-302(N). In this regard, in the O-RANs 302(1)-302(N) configured as O-RANs, the functionality of the base stations (e.g., gNB, as called in the context of 5G) of the respective O-RANs 302(1)-302(N) is divided into three (3) functional units of an O-RAN central unit (O-CU) 308(1)-308(N), an O-RAN distribution unit (O-DU) 310(1)-310(N), and the shared RU 304 as an O-RAN RU (O-RU) 304. These components may run on different hardware platforms and reside at different locations. The shared O-RU 304 includes the lowest layers of the base station, and it is the entity that wirelessly transmits and receives signals to user devices. The O-CUs 308(1)-308(N) include the highest layers of the base station and are coupled to a "core network" of the cellular service provider. The O-DUs 310(1)-310(N) include the middle layers of the base station to provide support for a single cellular service provider (also known as operator or carrier). F1 interfaces F1(1)-F1(N) are connected between the respective O-CUs 308(1)-308(N) and the O-DUs 310(1)-310(N). A respective eCPRI/O-RAN fronthaul interface 312(1)-312(N) connects the respective O-DUs 310(1)-310(N) to the shared O-RU 304 that serve signals of the "cells" of the O-DUs 310(1)-310(N). A "cell" in this context is a set of signals of a given service provider $SP_1$-$SP_N$ intended to serve subscriber units (e.g., cellular devices) in a certain area. The F1 interfaces F1(1)-F1(N) and eCPRI/O-RAN fronthaul interfaces 312(1)-312(N) use Ethernet protocol for conveying the data in this example. Therefore, Ethernet switches (not shown) may exist between the respective O-CUs 308(1)-308(N) and the O-DUs 310(1)-310(N) and between the respective O-DUs 310(1)-310(N) and the shared O-RU 304.

In the RAN system 300 in FIG. 3, the fronthaul of the O-RANs 302(1)-302(N) consists of four planes: User Plane (U-Plane), Control Plane (C-Plane), Management Plane (M-Plane) and Synchronization Plane (S-Plane) according to the O-RAN standards. The U-Plane carries O-RAN conforming user data in the communications signals 308D (1)-308D(N), 308U(1)-308U(N) as I-Q samples between the respective O-DUs 310(1)-310(N) and the shared O-RU 304. The C-Plane is used by the O-DUs 310(1)-310(N) to dynamically provide the shared O-RU 304 with information about the structure of downlink user data plane data to be received from O-DUs 310(1)-310(N) (and to be sent towards the user equipment by the O-RU 304) and the structure of uplink user data plane to be sent to the O-DUs 310(1)-310(N) (as received from the user equipment). The M-Plane is used to provide O-RU 304 with software updated and all configuration information to properly operate the O-RAN Fronthaul, the air interface of the O-RU 304, and other O-RU 304 operations. The M-Plane is also used to convey alarms, key performance indicator (KPI) logs and other O-RU 304 originating information. The M-Plane is terminated on one end at the O-RU 304 and on the other end of a respective O-RU controller 314(1)-314(N) in each respective O-RAN 302(1)-302(N). The O-RU controller 314(1)-314(N) can be a controller circuit (e.g., a microcontroller, a microprocessor) that can execute software and may be collocated with the function of the O-DUs 310(1)-310(N) or be a separate function from the O-DUs 310(1)-310(N). The S-Plane provides the O-RU 304 with time reference, typically using PTP 1588 protocol. The S-Plane is terminated at the O-RU 304 on one end and on the other end it is terminated at a timing source 316 (e.g., a clock circuit). The timing source may be collocated with an O-DU 310(1)-310(N) or be a separate entity from an O-DU 310(1)-310(N), such as a PTP Grand Master (GM) or a timing-aware Ethernet Switch typically configured as a boundary clock or transparent clock.

In a standard O-RAN configuration, each O-RU is not shared like shown in the RAN system 300 in FIG. 3, but rather is coupled to a single O-RU Controller that is fully responsible for managing, configuring, and monitoring a respective O-RU. This model works well when the O-RU is used in a single operator (i.e., service provider) arrangement. However, if the O-RU is desired to be operated in a service provider neutral arrangement (i.e., a single O-RU is shared and utilized for multiple service operators simultaneously like the O-RU 304 in the RAN system 300 in FIG. 3), each service operator would need to have its own M-Plane towards the O-RU 304. In this scenario using the RAN system 300 in FIG. 3 as an example, the O-RU 304 would need to be customized in design to support multiple M-Plane terminations. The shared O-RU 304 would also need to be designed and customized to handle all complexities related to coordinating and managing these independent M-Planes. In other words, an O-RU that is designed to support standard O-RAN interfaces is not designed to multiple O-RAN communications planes to support multiple service providers, and thus could not be used in a RAN system, like the RAN system 300 in FIG. 3. However, it is desired to not have to provide a customized O-RU that can support multiple M-Plane terminations in a RAN system to be able to provide for an O-RU to be shared between multiple RANs to support multiple service providers.

In this regard, FIG. 4 is an exemplary RAN system 400 that includes multiple RANs 402(1)-402(N), each configured to interface with a shared RU 404 through an intermediary neutral host agent device 418 that has a transparent interface to the respective DUs 310(1)-310(N) in the RANs 402(1)-402(N). As discussed in more detail below, the neutral host agent device 418 provides for the ability of DUs 310(1)-310(N) of the respective RANs 402(1)-402(N) and the shared RU 404 to be able to communicate information and signals to each other transparently according to a RAN standard (e.g., the O-RAN standard) as if the shared RU 404 was dedicated to one of the RANs 402(1)-402(N) (i.e., not shared between multiple RANs 402(1)-402(N)). The neutral host agent device 418 can be a circuit, such as a controller or processor, that executes software to perform designated tasks. As another example, the neutral host agent device 418 can be realized by software executed in another existing controller or processor that is included in the RAN system 400, such as an O-RU controller 314(1)-314(N) in a respective DU 310(1)-310(N). As shown in FIG. 4, the neutral host agent device 418 is communicatively coupled between the DUs 310(1)-310(N) of the multiple RAN 402(1)-402(N) and their shared RU 404. The neutral host agent device 418 is configured to support the coordination and management of communications (e.g., in communications planes) between the multiple RANs 402(1)-402(N) and the shared RU 404 that is otherwise not supported by a RAN standard. In this manner, the shared RU 404 does not have to be designed and implemented in a customized fashion with functionality not included in the RAN standard implemented by the RAN system 400 in order to handle and coordinate communications for multiple RANs 402(1)-402(N) to user devices, and vice versa. Thus, in an example, the neutral host agent device 418 also allows legacy RUs that are compatible with the RAN standard of the RAN system 400 to be shared by the multiple RANs 402(1)-402(N) without having to be customized and/or replaced. Note that the neutral host agent device 418 could be part of one of, or integrated into, one of the O-RU controllers 314(1)-314(N). The RAN system 400 in FIG. 4 in this example includes the RANs 402(1)-402(N) that are O-RANs 402(1)-402(N) that are compatible with the Open RAN standard set forth by the O-RAN Alliance referenced above. In this example, the O-CUs 308(1)-308 (N) and the O-DUs 310(1)-310(N) in the respective O-RANs 402(1)-402(N) have been described in regard to the RAN system 300 in FIG. 3 and thus are not redescribed. Common elements between the RAN system 300 in FIG. 3 and the RAN system 400 in FIG. 4 are shown with common element numbers.

Figure 5:
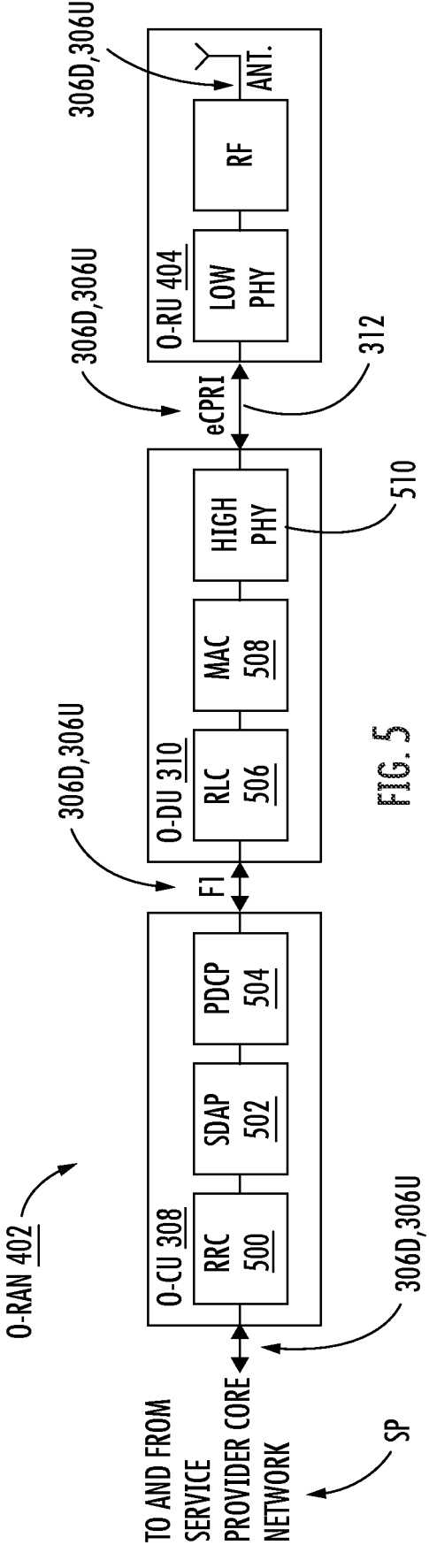
FIG. 5 is a schematic diagram of the exemplary division of components and communications layers between devices in an O-RAN in the RAN system in FIG. 4.

FIG. 5 is a schematic diagram of exemplary division of components and communications layers between devices in the O-RANs 402(1)-402(N) in FIG. 4. In this regard, the functionality of the base station (gNB, as called in the context of 5G) of the O-RAN 402 is divided into three functional units of the O-CU 308, the O-DU 310, and the O-RU 404 that may run on different hardware platforms and reside at different locations. The O-RU 404 includes the lowest layers of the base station, and it is the entity that wirelessly transmits the downlink communications signals 306D and receives the uplink communications signals 306U. The O-CU 308 includes the highest layers of the base and is coupled to the "Core Network" of the cellular service provider SP. The O-CU 308 hosts a handful of protocols, which are the radio resource control (RRC) 500, service data adaptation protocol (SDAP) 502, and packet data convergence protocol (PDCP 504. The O-DU 310 includes the middle layers of the base station. The O-DU 310 hosts another set of protocols, which are the radio link control (RLC) protocol 506, medium access control (MAC) protocol 508, and the physical interface (PHY) 510. The F1 interface connects between the O-CU 308 and the O-DU 310. The eCPRI/O-RAN Fronthaul interface 312 connects the O-DU 310 and the O-RU 404. The F1 and eCPRI/O-RAN Fronthaul interfaces F1, 312 can use Ethernet protocol for conveying the data in the downlink and uplink communications signals 306D, 306U between the units. The O-RU

404 processes radio frequencies received by the physical layer of the network PHYH within RF circuits 512.

With reference back to FIG. 4, the neutral host agent device 418 is placed logically between the shared O-RU 404 and the multiple O-RU controllers 314(1)-314(N). In this example, the neutral host agent device 418 utilizes M-Plane towards the O-RU 404 in the role of an O-RU controller. In this way, the shared O-RU 404 is designed to be communicatively coupled to a single O-RU controller like a typical O-RU 404 that is not shared between multiple O-RANs. The neutral host agent device 418 connects itself to each O-RU controller 314(1)-314(N) present in the RAN system 400 for the underlying shared O-RU 404. Each O-RU controller 314(1)-314(N) considers the neutral host agent device 418 as an actual O-RU that is dedicated to the O-RAN 402(1)-402(N) of the O-RU controller 314(1)-314(N). As discussed in more detail below, the neutral host agent device 418 is configured with the necessary information to discover the applicable O-RU controllers 314(1)-314(N) present. The neutral host agent device 418 is also configured with information on how the underlying shared O-RU 404 should be shared between the various O-RU controllers 314(1)-314(N) so that the multiple O-RANs 402(1)-402(N) can include the shared O-RU 404 as part of its O-RAN 402(1)-402(N) for distributed communications to user devices wirelessly communicating with the O-RU 404.

Note that single or multiple logical neutral host agent functions may locate in the neutral host agent device 418 as single physical device. Alternatively, the neutral host agent device 418 may be implemented as software solution operating on virtualized or nonvirtualized computing platform or it may be a specific solution with a specific combination of software and hardware.

With continuing reference to the RAN system 400 in FIG. 4, assume that the underlying shared O-RU 404 has 'A' RU communication capabilities (e.g., frequency bandwidth of a given frequency band) which is exposed (i.e., such information made available through communication of RU communication capability information 420 in FIG. 4) to the neutral host agent device 418 via the M-Plane. The neutral host agent device 418 can be configured to expose the 'A' RU communication capabilities of the O-RU 404 to each O-RU controller 314(1)-314(N) so that the total (summation) of the 'A' RU communication capabilities of the O-RU 404 does not exceed the total capability of the O-RU 404. In this manner, the RAN system 400 and the neutral host agent device 418 is configured to provide a portion or slice of the total of the 'A' RU communication capabilities of the O-RU 404 to a given O-RU controller 314(1)-314(N) for its exclusive use by its respective O-RAN 402(1)-402(N) and its service provider $SP_1$-$SP_N$. As long as each O-RU controller 314(1)-314(N) and the associated service provider $SP_1$-$SP_N$ stays within its allotted RU capability, each O-RU controller 314(1)-314(N) and associated service provider $SP_1$-$SP_N$ can utilize the underlying shared O-RU 404 independently of other each O-RU controller 314(1)-314(N) and their associated service providers $SP_1$-$SP_N$. As an example, the shared O-RU 404 may have the capability to support six (6) Component Carriers (CC) on a given band. In this example, assume there are two (2) O-RU controllers 314(1)-314(N). The neutral host agent device 418 may be configured to expose the two (2) CC capability to a first O-RU controller 314(1) and four (4) CC capability to the second O-RU controller 314(2). Similar slicing up of underlying O-RU communication capabilities may be performed, for example, for a variety of different RU communication capabilities, such as for example, available transmit power, supported bands, component carrier bandwidths, modulation types, or any other O-RU feature where its RU total capability needs to be allocated between multiple O-RU controllers 314(1)-314(N) for the O-RU 404 to be shared among the multiple O-RANs 402(1)-402(N).

The neutral host agent device 418 may also be configured to also represent the underlying RU communication capabilities to the O-RU controllers 314(1)-314(N) differently than simply slicing up the total RU communication capability of the shared O-RU 404. For example, the neutral host agent device 418 may be configured to expose overlapping RU communication capabilities to the O-RU controllers 314(1)-314(N) and then handle possible conflict situations between the O-RU controllers 314(1)-314(N) in a specific manner so that the overall RU communication capabilities of the shared O-RU 404 are not exceeded. The number of O-RU controllers 314(1)-314(N) connected to the neutral host agent device 418 can be one (1) or any number larger than one (1) up to 'N' total O-RU controllers 314(1)-314(N), in this example.

The neutral host agent device 418 may also be configured to broker the negotiation of the O-RAN fronthaul C-Plane and U-Plane connections between the O-RU controllers 314(1)-314(N) and the shared O-RU 404. In this regard, in an example, the neutral host agent device 418 may be configured to communicate given parameters for the O-RU controllers 314(1)-314(N) to the O-RU 404 and given parameters for the shared O-RU 404 to the O-RU controllers 314(1)-314(N) so that C-Plane and U-Plane connections can be established. The neutral host agent device 418 may also include circuitry and/or functionality to communicate other information between the shared O-RU 404 and the O-RU controllers 314(1)-314(N). For example, neutral host agent device 418 may receive alarms, log files, and/or KPIs from the shared O-RU 404 and selectively provide such received information to specific O-RU controllers 314(1)-314(N), depending on which O-RU controller 314(1)-314(N) the information is applicable for or depending on how the neutral host agent device 418 is configured. Also, in another example, the neutral host agent device 418 may also be configured to perform software updates for the underlying shared O-RU 404, and/or it may authorize/allow only a subset of O-RU controllers 314(1)-314(N) (e.g., just one (1) of them) to perform such software updates through the neutral host agent device 418.

Thus, as an example with regard to the RAN system 400 in FIG. 4 that employs the neutral host agent device 418 physically and/or logically inserted between one or more of O-RU controllers 314(1)-314(N) and shared O-RU 404, to provide an interface between the O-RU 404 and such one or more of O-RU controllers 314(1)-314(N), the following principles may be applicable: (1) the O-RU 404 has just one M-plane connection with one (1) logical O-RU controller 314(1)-314(N) controlling the O-RU 404 via the neutral host agent device 418 (i.e., there is no change in the functionality of the shared O-RU 404 compared to the typical or conventional O-RU functionality as specified in O-RAN Alliance for M-Plane); (2) each O-RU controller 314(1)-314(N) gets communicatively connected to the neutral host agent device 418 as it would be connecting to a single service provider O-RU (i.e., in the functionality of the O-RU controllers 314(1)-314(N) as compared to the typical or conventional O-RU controller functionality as specified in O-RAN Alliance for M-Plane); and (3) the logic and configuration information needed to share the RU communication capabilities of the O-RU 404 between the O-RU controllers 314(1)-314(N) is part of the logical functionality of the neutral host agent device 418. Thus, based on the physical and/or logical insertion of the neutral host agent device 418 between one or more of O-RU controllers 314(1)-314(N) and shared O-RU 404 to provide an interface between the O-RU 404 and such one or more of O-RU controllers 314(1)-314(N), the neutral host agent device 418 is transparent to the O-RU controllers 314(1)-314(N) and shared O-RU 404. The neutral host agent device 418 provides a transparent communication interface to both the shared O-RU 404 and the O-RU controllers 314(1)-314(N), such that a conventionally designed O-RUs and O-RU controllers can be employed in the RAN system 400 in FIG. 4 and be reused without modification of the O-RUs and O-RU controllers. The neutral host agent device 418 allows the support of multiple communications planes as part of the O-RAN Standard with multiple O-RU controllers without such functionality having to be provided in a modified shared O-RU.

Note that although the neutral host agent device 418 in the RAN system 400 in FIG. 4 is shown and described above as facilitating multiple DUs 310(1)-310(N) in their respective RANs 402(1)-402(N) accessing and sharing the communication capabilities of the RU 404, such is not limiting. As an alternative example, the neutral host agent device 418 can facilitate multiple DUs 310(1)-310(N) in a single RAN among the multiple RANs 402(1)-402(N) transparently interfacing with the RU 404 to share the communication capabilities of the RU 404. As another alternative example, the neutral host agent device 418 can facilitate in a single DU 310(1)-310(N) in a single RAN of the multiple RANs 402(1)-402(N) transparently interfacing with the RU 404 to access the communication capabilities of the RU 404. As another alternative example, the neutral host agent device 418 can facilitate a single DU 310(1)-310(N) among the plurality of respective multiple RAN 402(1)-402(N) transparently interfacing with the RU 404 to access the communication capabilities of the RU 404. The neutral host agent device 418 is configured to respond and handle each of the examples because of the neutral host agent device's 418 discovery process to discover the DUs 310(1)-310(N) and the RU 404 and sharing the discovered communication capabilities and communications assignments for the discovered DUs 310(1)-310(N) and the RU 404.

FIG. 6 is a flowchart illustrating an exemplary process 600 of the neutral host agent device 418 in FIG. 4 discovering and setting up communication channels for interfacing the shared O-RU 404 to the O-DUs 310(1)-310(N) (e.g., their respective O-RU controllers 314(1)-314(N)) among the multiple O-RANs 402(1)-402(N). The process 600 in FIG. 6 references one or more RUs, because as discussed later below, the neutral host agent device 418 can be configured to interface multiple shared RUs to multiple RANs. Also, the process 600 in FIG. 6 references an RU and DUs, but note these can be the respective O-RUs 404 and O-DUs 310(1)-310(N) in the RAN system 400 in FIG. 4. The process 600 in FIG. 6 is described in reference to the RAN system 400 in FIG. 4, but note that the process 600 in FIG. 6 is not limited to RAN system 400 like that shown in FIG. 4.

In this regard, a first step in the process that the neutral host agent device 418 (and/or its controller) performs in this example is discovering the presence the shared O-RU 404 (block 602 in FIG. 6). This is performed by a communication over the M-Plane between the neutral host agent device 418 and the shared O-RU 404. A next step the neutral host agent device 418 (and/or its controller) performs in this example is receiving RU communication capability information 420 and determine a total RU communication capability for shared RU 404 (block 604 in FIG. 6). In the example of the RAN system 400 in FIG. 4, there is only one (1) shared O-RU 404, so the RU communication capability information 420 for the shared RU 404 is the total RU communication capability. For example, as discussed above, the RU communication capability may be available transmit power, supported bands, component carrier bandwidths, modulation types, or any other O-RU feature where its RU total capability needs to be allocated between multiple O-RU controllers 314(1)-314(N) for the O-RU 404 to be shared among the multiple O-RANs 402(1)-402(N). A next step that the neutral host agent device 418 (and/or its controller) performs in this example is discovering the presence of each O-DU 310(1)-310(4) (block 606 in FIG. 6). In this manner, the neutral host agent device 418 is aware of the number of shared O-RUs 404 and DUs 310(1)-310(4) in the RAN system 400 to be transparently interfaced together.

With continuing reference to FIG. 6, a next step that the neutral host agent device 418 (and/or its controller) performs in this example is assigning one or more subsets of the total RU communication capability of the one or more RU communication capabilities 422(1)-422(N) for the shared O-RU 404 to at least one O-DU of the one or more O-DUs 310(1)-310(N) (block 608 in FIG. 6). In other words, the neutral host agent device 418 determines which portion or slice of the total RU communication capability of the shared O-RU 404 is to be exposed or made available to each O-RAN 402(1)-402(N) via its O-DUs 310(1)-310(N) (e.g., its O-RU controllers 314(1)-314(N)). Then, as a next step, the neutral host agent device 418 (and/or its controller) in this example communicates the assigned one or more subsets of the total RU communication capabilities 422(1)-422(N) to the assigned at least one O-DU 310(1)-310(N) (block 610 in FIG. 6).

With continuing reference to FIG. 6, in response to the assigned RU communication capabilities 422(1)-422(N) being provided to the assigned O-DUs 310(1)-310(N), the neutral host agent device 418 receives DU communication channel information 424(1)-424(N) for the at least one assigned O-DU 310(1)-310(N), based on the one or more subsets of the total RU communication capability of the assigned RU communication capabilities 422(1)-422(N) assigned to the at least one DU 310(1)-310(N) (block 612 in FIG. 6). The neutral host agent device 418 (and/or its controller) then maps channel routing 426 for the assigned at least one O-DU 310(1)-310(N) to the shared O-RUs 404, based on the received DU communication channel information 424(1)-424(N) for the assigned at least one O-DU 310(1)-310(N) (block 614 in FIG. 6). This is so that the neutral host agent device 418 can manage and route downlink communications signals 306D(1)-306D(N) and uplink communications signals 306U(1)-306U(N) between the O-DUs 310(1)-310(N) and the shared O-RU 404 based on the assigned RU communication capabilities 422(1)-422(N) assigned to the O-DUs 310(1)-310(N). Also for example, as discussed later below, if the RAN system 400 in FIG. 4 were to include multiple shared O-RUs 404, the neutral host agent device 418 would use the channel routing 426 to manage and route downlink communications signals 306D(1)-306D(N) and uplink communications signals 306U(1)-306U(N) between the O-DUs 310(1)-310(N) and multiple shared O-RUs 404 based on the assigned RU communication capabilities 422(1)-422(N) assigned to the O-DUs 310(1)-310(N). The neutral host agent device 418 then communicates communication channel configuration 428 to the shared O-RU 404 based on mapped channel routing 426, for communication between the shared O-RU 404 and the assigned at least one O-DU 310(1)-310(N) (block 616 in FIG. 6).

Figure 7B:
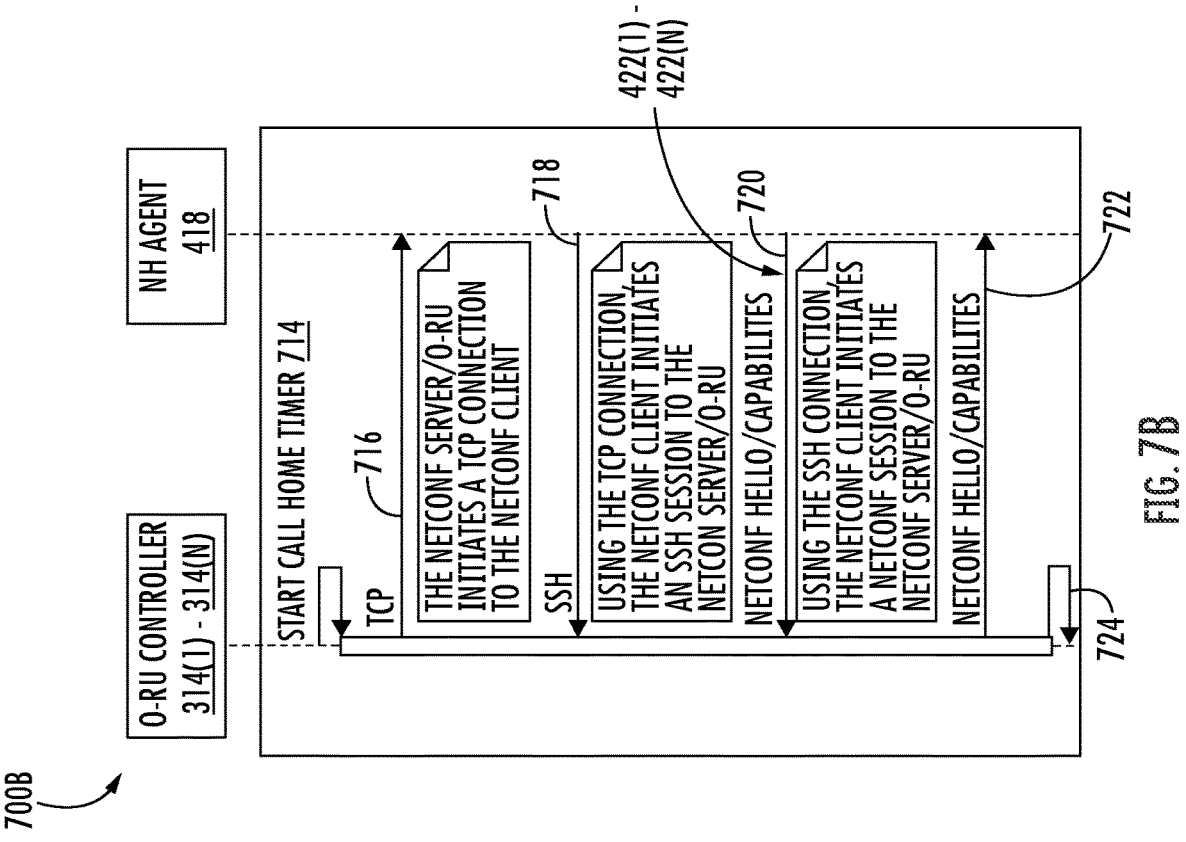
FIGS. 7A and 7B are communication diagrams illustrating an exemplary communication signal flow between a shared RU and a neutral host agent device in RAN system, and between the DUs and a neutral host agent device, such as the RAN system in FIG. 4, for the neutral host agent device to discover the shared RU and DUs and RU communication capabilities.
Figure 7A:
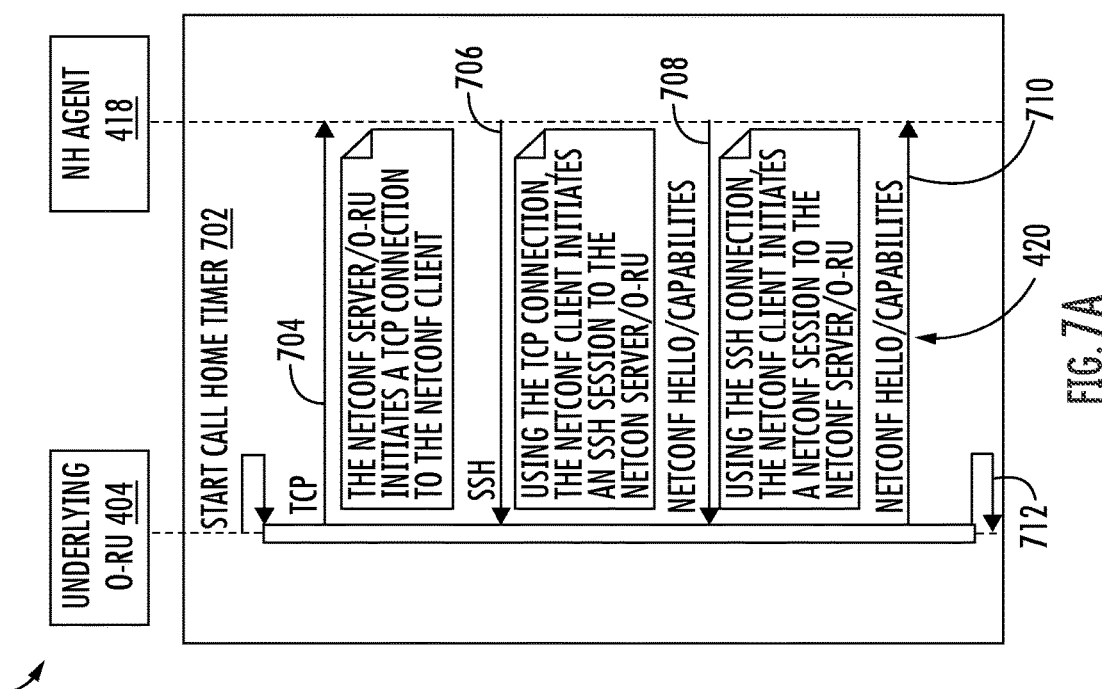

FIGS. 7A and 7B are communication diagrams 700A, 700B illustrating an exemplary communication signal flow between a shared RU, such as the shared O-RU 404 in FIG. 4, and a neutral host agent device, such as the neutral host agent device 418 in FIG. 4, for the neutral host agent device to discover the shared RU. The communication diagram 700 in FIG. 7 also illustrates an exemplary communication signal flow between DUs, such as the DUs 310(1)-310(N) in FIG. 4, and a neutral host agent device, such as the neutral host agent device 418 in FIG. 4, for the neutral host agent device to discover DUs in respective RANs. These communication diagrams 700A, 700B are an example of the process steps 602-608 in the process 600 in FIG. 6.

In this regard, as shown in communication diagram 700A in FIG. 7A, for the neutral host agent device 418 to discover the shared RU 404 (or multiple shared RUs if such exist), the O-RU 404 starts a timer after a reset (block 702 in FIG. 7A). A server (e.g., a NETCONF server) of the O-RU 404 then initiates a connection (e.g., a TCP connection) to a client (e.g., a NETCONF client) hosted by the neutral host agent device 418 (block 704 in FIG. 7A). In response, the client in the neutral host agent device 418, using the connection, initiates a communication session (e.g., a SSH communication session) to the server of the O-RU 404 (block 706 in FIG. 7A). The client of the neutral host agent device 418 then initiates a communication session with the O-RU 404 to request RU communication capability information 420 for the O-RU 404 to discover the RU communication capability of the O-RU 404 (block 708 in FIG. 7A). In response, the server of the O-RU 404 responds by sending the RU communication capability information 420 indicating its RU communication capabilities in the established communication session to the neutral host agent device 418 (block 710 in FIG. 7A). As discussed above, the neutral host agent device 418 will use the received RU communication capability information 420 to determine how to assign such RU communication capabilities to the O-RU controllers 314(1)-314(N) as part of their discovery process. The O-RU 404 then stops the timer (block 712 in FIG. 7A).

Similarly, as shown in communication diagram 700B in FIG. 7B, for the neutral host agent device 418 to discover the O-RU controllers 314(1)-314(N), the O-RU controllers 314(1)-314(N) start a timer after a reset (block 714 in FIG. 7B). A server (e.g., a NETCONF server) of the O-RU controllers 314(1)-314(N) then initiates a connection (e.g., a TCP connection) to a client (e.g., a NETCONF client) hosted by the neutral host agent device 418 (block 716 in FIG. 7B). In response, the client in the neutral host agent device 418, using the connection, initiates a communication session (e.g., a SSH communication session) to the server of the O-RU controllers 314(1)-314(N) (block 718 in FIG. 7B). The client of the neutral host agent device 418 then initiates a communication session with the O-RU controllers 314(1)-314(N) to provide assigned RU communication capabilities 422(1)-422(N) of the discovered O-RU 404 to the O-RU controllers 314(1)-314(N) (block 720 in FIG. 7B). In response, the server of the O-RU controllers 314(1)-314(N) determines and provides its DU communication channel information 424(1)-424(N) in the established communication session to the neutral host agent device 418 that will be used by the neutral host agent device 418 to provide communication routing between the O-RU controllers 314(1)-

314(N) and the shared O-RU 304 (block 722 in FIG. 7B). The O-RU controllers 314(1)-314(N) then stop their timers (block 724 in FIG. 7B).

Figure 8:
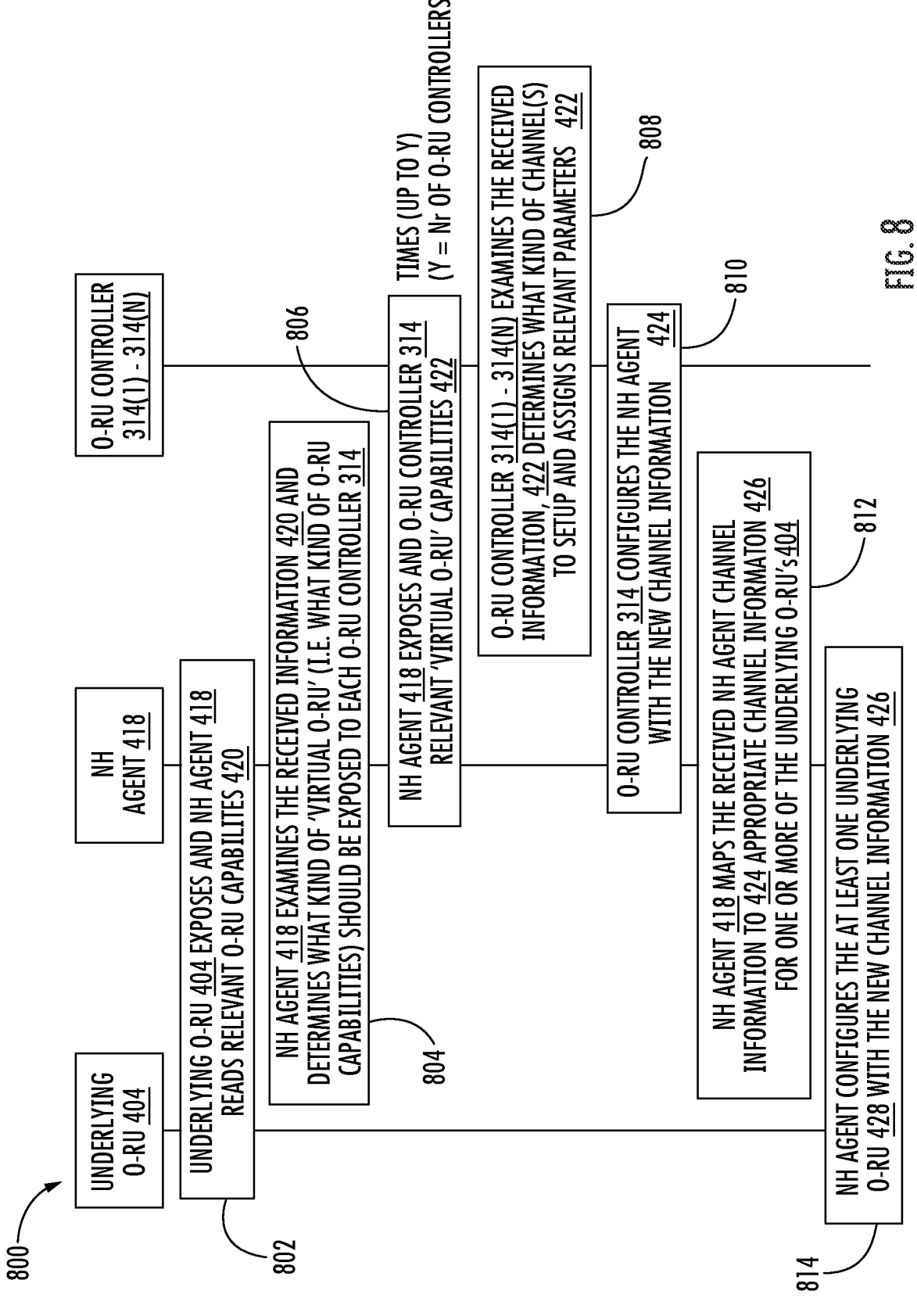
FIG. 8 is a communication diagram illustrating an exemplary communication signal flow to setup communications channels between a shared RU and a neutral host agent device and DUs in RAN system, such as the RAN system in FIG. 4.

FIG. 8 is a communication diagram 800 illustrating an exemplary communication signal flow to setup communications channels between a shared RU and a neutral host agent device and DUs in RAN system, such as the RAN system 400 in FIG. 4. In this regard, as shown in FIG. 8, as part of the discovery process, the shared O-RU 404 shares its RU communication capability through the RU communication capability information 420 to the neutral host agent device 418 (block 802 in FIG. 8). The neutral host agent device 418 receives the RU communication capability information 420 and determines what kind of O-RU communication capabilities of the shared O-RU 404 should be exposed to each O-RU controller 314(1)-314(N) as assigned O-RU controllers 314(1)-314(N) of such O-RU communication capabilities (block 804 in FIG. 8). The neutral host agent device 418 then communicates the assigned RU communication capabilities 422(1)-422(N) to its determined one or more assigned O-RU controllers 314(1)-314(N) (block 806 in FIG. 8). The O-RU controllers 314(1)-314(N) then examines its received RU communication capabilities 422(1)-422(N) and determine what kind of communication channels to setup to be assigned to the shared O-RU 404 as well as relevant communications parameters (block 808 in FIG. 8) as its DU communication channel information 424(1)-424(N). The O-RU controllers 314(1)-314(N) then communicate the DU communication channel information 424(1)-424(N) to the neutral host agent device 418 (block 810 in FIG. 8). The neutral host agent device 418 then maps channel routing for the O-RU controllers 314(1)-314(N) based on the received DU communication channel information 424(1)-424(N) (block 812 in FIG. 8). The neutral host agent device 418 then configures the shared O-RU 404 and its communication channel configuration 428 based on the map channel routing for communications between the shared O-RU 404 and the O-RU controllers 314(1)-314(N) (block 814 in FIG. 8).

As an example, the RU communication capability information 420 that is communicated by the shared O-RU 404 to the neutral host agent device 418 can include one or more frequency bands and a bandwidth for each of one or more frequency bands for the shared O-RU 404 as part of its total RU communication capability. The neutral host agent device 418 can be configured to receive this RU communication capability information 420 and assign at least a portion of the bandwidth of at least one frequency band of the one or more frequency bands of the shared O-RU 404 to one or more assigned O-RU controllers 314(1)-314(N), based on the assigned RU communication capabilities assigned to the O-RU controllers 314(1)-314(N).

In another example, the RU communication capability information 420 that is communicated by the shared O-RU 404 to the neutral host agent device 418 can include splitting up a frequency band supported by the shared O-RU 404 to be assigned over multiple O-RU controllers 314(1)-314(N). In this regard, neutral host agent device 418 can be configured to receive the RU communication capability information 420 that includes a first frequency band having a first bandwidth from the shared O-RU 404 as part of the total RU communication capability for shared O-RU 404. The neutral host agent device 418 can be configured to receive this RU communication capability information 420 and expose such as RU communication capabilities 422(1)-422(N) to the respective O-RU controllers 314(1)-314(N). The neutral host agent device 418 can then be configured to receive DU communication channel information 424(1)-424(N) from the respective O-RU controllers 314(1)-314(N) indicating how to assign or map such RU communication capability of the first bandwidth of the shared O-RU 404 to the O-RU controllers 314(1)-314(N). The neutral host agent device 418 can be configured to assign/map a first portion of the first bandwidth of the shared O-RU 404 to a first assigned O-RU controller 314(1)-314(N), and assign/map a second portion of the first bandwidth of the shared O-RU 404 to a second assigned O-RU controller 314(1)-314(N) different from the first assigned O-RU controller 314(1)-314(N).

In another example, the RU communication capability information 420 that is communicated by a plurality of shared O-RUs 404 to the neutral host agent device 418 can include assigning frequency bands supported by the multiple shared O-RU 404 to be assigned to a single O-RU controllers 314(1)-314(N). In this regard, neutral host agent device 418 can be configured to receive the RU communication capability information 420 that includes frequency bands from multiple shared O-RUs 404 as part of the total RU communication capability for shared O-RUs 404. The neutral host agent device 418 can be configured to receive this RU communication capability information 420 and expose such as RU communication capabilities 422(1)-422(N) to the respective O-RU controllers 314(1)-314(N). The neutral host agent device 418 can then be configured to receive DU communication channel information 424(1)-424(N) from the respective O-RU controllers 314(1)-314(N) indicating how to assign or map such RU communication capability of the shared O-RUs 404 to the O-RU controllers 314(1)-314 (N). The neutral host agent device 418 can be configured to assign/map the frequency bands supported by multiple shared O-RUs 404 to single O-RU controller 314(1)-314(N).

In another example, the shared O-RU 404 may have the ability to support multiple component carriers on a given frequency band. For example, if the shared O-RU 404 can support six (6) component carriers, their neutral host agent device 418 can be configured to expose a subset of this component carriers to different O-RU controllers 314(1)-314(N), thus splitting the frequency band capability of the shared O-RU 404 among multiple O-RU controllers 314(1)-314(N). In this regard, the neutral host agent device 418 can be configured to receive RU communication capability information 420 of a first frequency band having a plurality of component carriers from the shared O-RU 404. The neutral host agent device 418 can be configured to receive DU communication channel information 424(1)-424(N) from a plurality of O-RU controllers 314(1)-314(N) that includes a first portion of the plurality of component carriers for a first assigned O-RU controller 314(1)-314(N) based on the assigned RU communication capabilities 422(1)-422(N), and a second portion of the plurality of component carriers for a second assigned O-RU controller 314(1)-314(N), based on the assigned RU communication capabilities 422(1)-422 (N). The neutral host agent device 418 can then be configured to map channel routing for communications between the shared O-RU 404 and the assigned O-RU controllers 314(1)-314(N) by being configured to map the first portion of the plurality of component carriers for the first assigned O-RU controller 314(1)-314(N), based on the received DU communication channel information 424(1)-424(N) from the first assigned O-RU controller 314(1)-314(N), and map the second portion of the plurality of component carriers for the second assigned O-RU controller 314(1)-314(N), based on the received DU communication channel information 424(1)-424(N) from the second assigned O-RU controller 314(1)-314(N).

In another example, note that the neutral host agent device 418 can be configured to not communicate RU communication capabilities 422(1)-422(N) to the O-RU controllers 314(1)-314(N) greater than the total RU communication capability of all the shares O-RUs 404. This is so that an O-RU controller 314(1)-314(N) does not try to configure itself to use RU communication capabilities that do not exist or that may not be available.

With reference back to FIG. 4, after the discovery and communication channel setup processes have been performed as discussed by example above, the neutral host agent device 418 can facilitate the mapping of communications between the O-RANs 402(1)-402(N) and the shared O-RU 404 using the channel routing that was mapped between the O-RU controllers 314(1)-314(N) and the shared O-RU 404. For example, when the neutral host agent device 418 receives an uplink channel (as part of an uplink communications signal 306U from the shared O-RU 404, the neutral host agent device 418 can use the channel routing information to communicate such received uplink channel to an O-RU controller 314(1)-314(N) based on the mapping of that uplink channel to an assigned O-RU controller 314(1)-314(N). When the neutral host agent device 418 receives a downlink channel (as part of a downlink communications signal 306D from an O-RU controller 314(1)-314(N)), the neutral host agent device 418 can use the channel routing information to communicate such received downlink channel to a shared O-RU 404 based on the mapping of that downlink to a shared O-RU 404.

Figure 9:
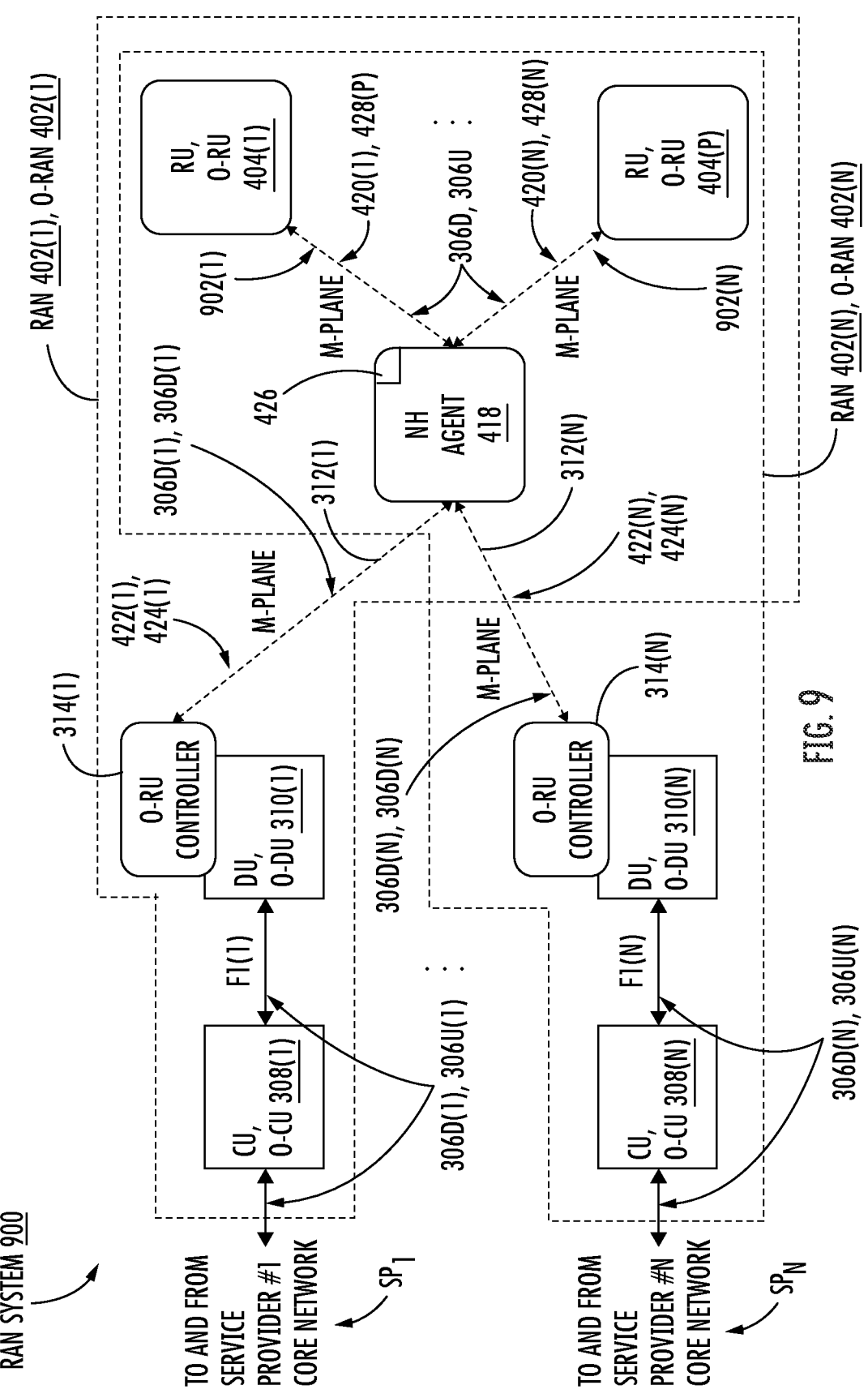
FIG. 9 is another exemplary RAN system that includes multiple RANs implemented according to a RAN standard (e.g., O-RAN standard), wherein each DU of the RANs is configured to interface with the multiple shared RUs through an intermediary neutral host agent device that has a transparent interface to the shared RUs and the DUs.

Note that although the RAN system 400 in FIG. 4 shows only one shared O-RU 404 whose RU communication capabilities are shared by the multiple RANs 402(1)-402(N) through use of the neutral host agent device 418, the neutral host agent device 418 can also be configured to coordinate and map the RU communication capabilities of multiple shared O-RUs to multiple RANs in a RAN-system. In this regard, FIG. 9 is another exemplary RAN system 900 that includes the multiple RANs 402(1)-402(N) like in the RAN system 400 in FIG. 4, which in this example are also O-RANs. The neutral host agent device 418 is configured to interface the multiple O-DUs 310(1)-310(N), and their respective O-RU controllers 314(1)-314(N) in this example, with multiple shared O-RUs 404(1)-404(P). Common elements between the RAN system 300 in FIG. 3 and the RAN system 400 in FIG. 4, and the RAN system 900 in FIG. 9 and are shown with common element numbers in FIG. 9 and are not re-described.

In this regard, with reference to the RAN system 900 in FIG. 9, the multiple O-DUs 310(1)-310(N), and their respective O-RU controllers 314(1)-314(N) are each configured to interface with a shared RU 404 through an intermediary neutral host agent device 418 that has a transparent interface to the respective DUs 310(1)-310(N) in the RANs 402(1)-402(N). As discussed in more detail below, the neutral host agent device 418 provides for the ability of DUs 310(1)-310(N) of the respective RANs 402(1)-402(N) and the shared RU 404 to be able to communicate information and signals to each other transparently according to a RAN standard (e.g., the O-RAN standard) as if the shared RU 404 was dedicated to one of the RANs 402(1)-402(N) (i.e., not shared between multiple RANs 402(1)-402(N)). The neutral host agent can be a circuit, such as a controller or processor that executes software to perform designated tasks. As shown in FIG. 9, the neutral host agent device 418 is communicatively coupled between the DUs 310(1)-310(N) of the multiple RAN 402(1)-402(N) and their shared RU 404. The neutral host agent device 418 is configured to support the coordination and management of communications (e.g., in communications planes) between the multiple RANs 402(1)-402(N) and the shared RU 404 that is otherwise not supported by a RAN standard. In this manner, the shared RU 404 does not have to be designed and implemented in a customized fashion with functionality not included in the RAN standard implemented by the RAN system 400 in order to handle and coordinate communications for multiple RANs 402(1)-402(N) to user devices, and vice versa. Thus, in an example, the neutral host agent device 418 also allows legacy RUs that are compatible with the RAN standard of the RAN system 400 to be shared by the multiple RANs 402(1)-402(N) without having to be customized and/or replaced. Note that the neutral host agent device 418 could be part of one of, or integrated into one of, the O-RU controllers 314(1)-314(N).

The RAN system 400 in FIG. 9 in this example includes the RANs 402(1)-402(N) that are O-RANs 402(1)-402(N) that are compatible with the Open RAN standard set forth by the O-RAN Alliance referenced above. In this example, the O-CUs 308(1)-308(N) and the O-DUs 310(1)-310(N) in the respective O-RANs 402(1)-402(N) have been described in regard to the RAN system 300 in FIG. 3 and thus are not re-described. Common elements between the RAN system 300 in FIG. 3 and the RAN system 900 in FIG. 9 are shown with common element numbers. The exemplary functionality discussed above with regard to the RAN system 400 and the neutral host agent device 418 in FIG. 4 is also applicable to the RAN system 900 in FIG. 9. In the RAN system 900 in FIG. 9, the neutral host agent device 418 will receive multiple RU communication capabilities information 420 (1)-420(N) from multiple O-RUs 404(1)-404(P) to then compile a total RU communication capability. The neutral host agent device 418 will then determine how to allocate or expose this RU communication capability out of the total RU communication capability of the O-RUs 404(1)-404(P) to assigned O-RU controllers 314(1)-314(N) to then map channel routing between the O-RU controllers 314(1)-314 (N) and the multiple O-RUs 404(1)-404(P) based on received DU communication channel information from the assigned O-RU controllers 314(1)-314(N).

Note that the neutral host agent device 418 can also be configured to receive RU management information 902(1)-902(N) from the O-RUs 404(1)-404(N), and communicate such RU management information 902(1)-902(N) to their assigned O-DUs 310(1)-310(N). This management information can include alarms, KPI logs, and other O-RU originating information (e.g., that is designed to be communicated over the M-Plane according to the O-RAN standard).

The example RAN system 900 in FIG. 9 is described above with the example of the neutral host agent device 418 facilitating multiple DUs 310(1)-310(N) in the respective multiple RANs 402(1)-402(N) transparently interfacing with one or more of the multiple RUs 404(1)-404(P) to access the shared communication capabilities of one or more of the multiple RUs 404(1)-404(P). Note however that such is not limiting. As an alternative example, the neutral host agent device 418 in the RAN system 900 in FIG. 9 can facilitate multiple DUs 310(1)-310(N) in a single RAN among the RANs 402(1)-402(N) in the RAN system 900 in FIG. 9 interfacing with the neutral host agent device 418 to share the communication capabilities of one or more of the multiple RUs 404(1)-404(P). As another alternative example, the neutral host agent device 418 in the RAN system 900 in FIG. 9 can facilitate in a single DU 310(1)-310(N) in a single RAN of the RANs 402(1)-402(N) transparently interfacing with one or more of the multiple RUs 404(1)-404(P) to access the communication capabilities of one or more of the multiple RUs 404(1)-40(P). As another alternative example, the neutral host agent device 418 in the RAN system 900 in FIG. 9 can facilitate a single DU 310(1)-310(N) among the multiple respective RAN 402(1)-402(N) transparently interfacing one or more of the multiple RUs 404(1)-404(P) to access the communication capabilities of one or more of the multiple RUs 404(1)-404(P). The neutral host agent device 418 in the RAN system 900 in FIG. 9 is configured to respond and handle each of these examples, because of the neutral host agent device's 418 discovery process to discover the DUs 310(1)-310(N) and the RU 404 and sharing the discovered communication capabilities and communications assignments for the discovered DUs 310(1)-310(N) and the RUs 404(1)-404(P).

Figure 10:
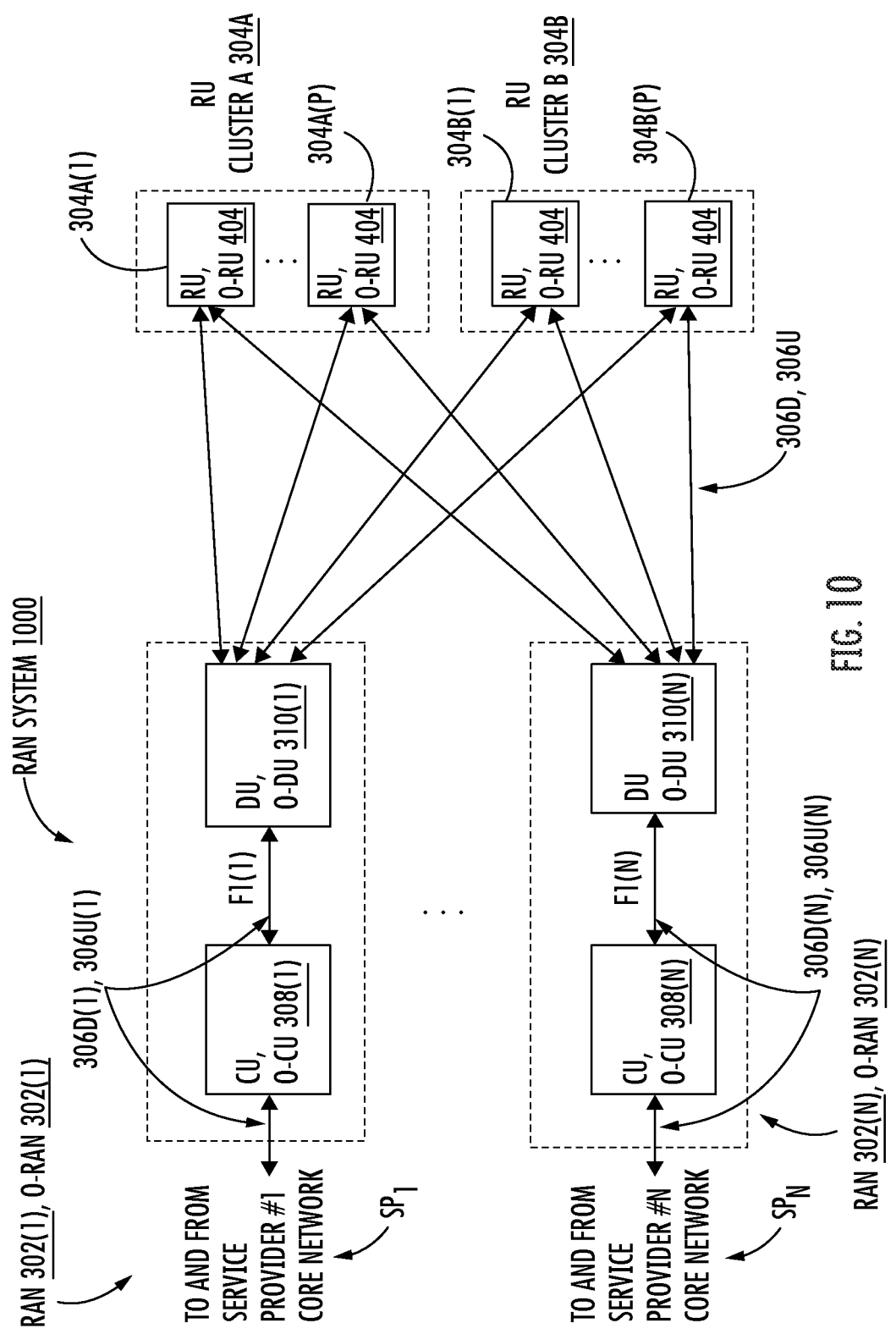
FIG. 10 is another exemplary RAN system that includes multiple RANs implemented according to a RAN standard (e.g., O-RAN standard) and each configured to support a different service provider, wherein each RAN includes a DU configured to directly interface with the multiple shared modified RU clusters.

Note that a RAN system may also include clustering of RUs, as shown in the RAN system 1000 in FIG. 10. The RAN system 1000 includes multiple O-RANs 302(1)-302 (N) like the RAN system 300 in FIG. 3. Common elements between the RAN system 1000 in FIG. 10 and the RAN system 300 in FIG. 3 are shown with common element numbers in FIG. 10. However, the RAN system 1000 in FIG. 10 includes multiple shared O-RUs that are grouped in RU clusters, shown as two (2) RU clusters 304A, 304B: RU cluster A with O-RUs 304A(1)-304A(P), and RU cluster B with O-RUs 304B(1)-304B(P) for a total of four O-RUs. However, like the RAN system 300 in FIG. 3, if the O-RUs 304A(1)-304A(P), 304B(1)-304B(P) are desired to be operated in a service provider neutral arrangement, each O-DU 310(1)-310(N) would need to have its own M-Plane towards the O-RUs 304A(1)-304A(P), 304B(1)-304B(P). In this scenario, the O-RUs 304A(1)-304A(P), 304B(1)-304B(P) would need to be customized in design to support multiple M-Plane terminations. The shared O-RU 304A(1)-304A(P), 304B(1)-304B(P) would also need to be designed and customized to handle all complexities related to coordinating and managing these independent M-Planes. In other words, an O-RU that is designed to support standard O-RAN interfaces is not designed to support multiple O-RAN communications planes to support multiple service providers, and thus could not be used in a RAN system like the RAN system 1000 in FIG. 10. However, it is desired to not have to provide a customized O-RU that can support multiple M-Plane terminations in a RAN system to be able to provide for RU clusters 304A, 304B to be shared between multiple RANs to support multiple service providers.

Figure 11:
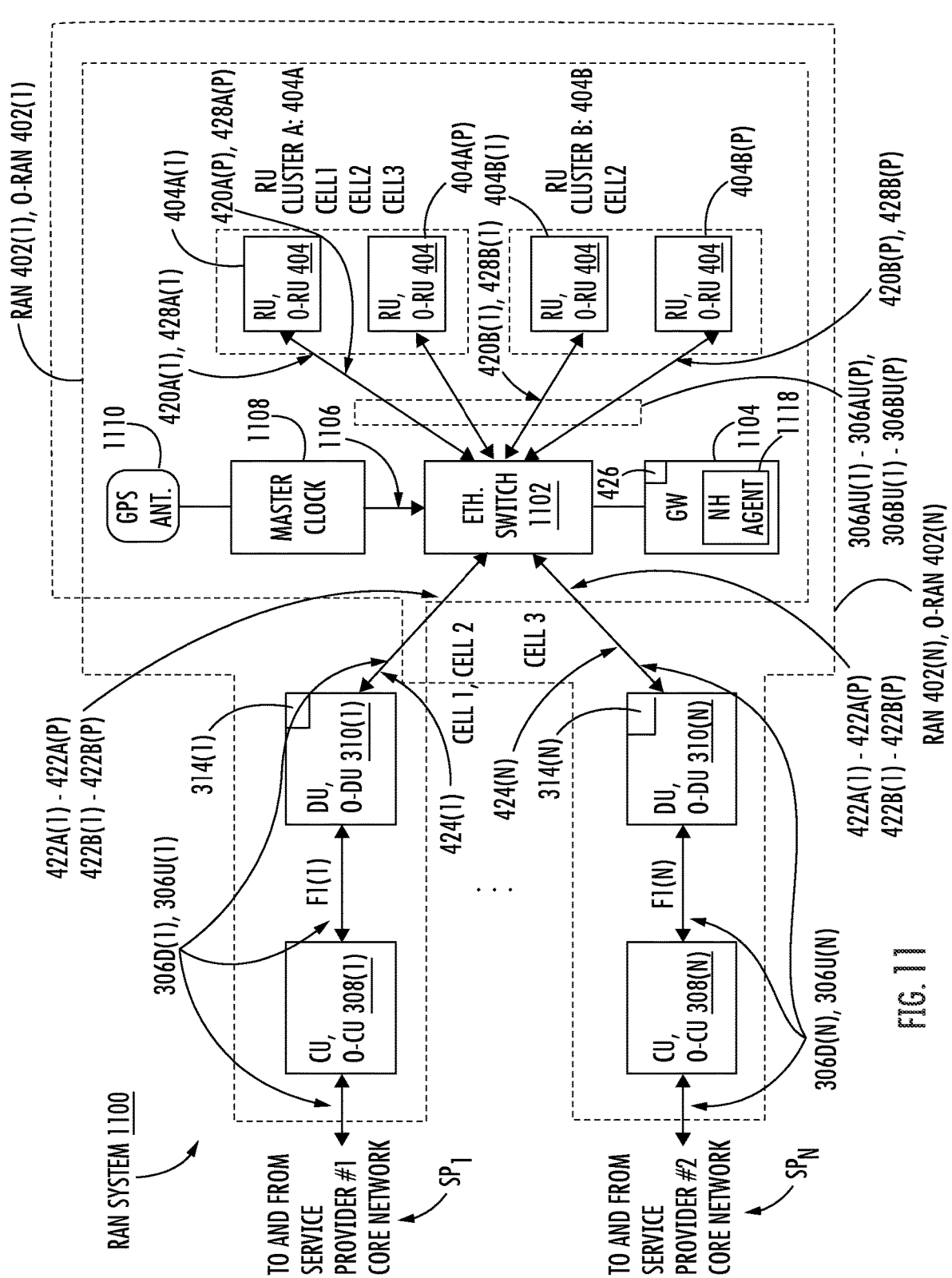
FIG. 11 is another exemplary RAN system that includes multiple RANs implemented according to a RAN standard (e.g., O-RAN standard) and each configured to support a different service provider, wherein each RAN includes DUs configured to interface with multiple shared RU clusters through an intermediary neutral host agent device that includes an Ethernet switch whose routing is controlled a front haul gateway (FNGW) device to multi-cast DU originated packets to the destination RUs according to a pre-configured cluster mapping configured in an Ethernet switch.

In this regard, FIG. 11 is another exemplary RAN system 1100 that includes multiple O-RANs 402(1)-402(N) like the RAN system 400 in FIG. 4 and configured to interface with multiple shared RU clusters 404A, 404B through an intermediary neutral host agent device 1118. The neutral host agent device 1118 is configured to interface with multiple RU clusters 404A, 404B that include RU cluster A with O-RUs 404A(1)-404A(P), and RU cluster B with O-RUs 404B(1)-404B(P) for a total of four O-RUs like included in the RAN system 1000 in FIG. 10. As discussed in more detail below, the neutral host agent device 1118 provides for the ability of DUs 310(1)-310(N) of the respective RANs 402(1)-402(N) and the clustered O-RUs 404A(1)-404A(P), 404B(1)-404B(P) to be able to communicate information and signals to each other transparently according to a RAN standard (e.g., the O-RAN standard) as if the shared RU 404 was dedicated to one of the O-RANs 402(1)-402(N) (i.e., not shared between multiple RANs 402(1)-402(N)). The neutral host agent device 1118 can be a circuit, such as a controller or processor that executes software to perform designated tasks. As another example, the neutral host agent device

1118 can be realized by software executed in another, existing controller or processor that is include in the RAN system 1100, such as an O-RU controller 314(1)-314(N) in a respective DU 310(1)-310(N). Common elements between the RAN system 1100 in FIG. 11 and the RAN system 400 in FIG. 4 are shown with common element numbers.

As shown in FIG. 11, the neutral host agent device 1118 is communicatively coupled to a network switch 1102 (e.g., an Ethernet switch) that is couped between the DUs 310(1)-310(N) of the multiple RAN 402(1)-402(N) (or their O-RU controllers 314(1)-314(N)) and their shared RU 404. The neutral host agent device 418 is part a network gateway 1104 (e.g., a fronthaul gateway (FHGW)). The communication switching in the network switch 1102 is synchronized based on a clock signal 1106 from a master clock 1108, whose master time may be set through a global positioning coordinate (GPS) via signals received from a GPS antenna 1110. For example, the master clock 1108 may be a grand master (GM) clock as part of a RAN standard, which is a highly accurate oscillator compensated for conditions, such sas temperature, jitter, and/or drifts. The neutral host agent device 418 is configured to support the coordination and management of communications (e.g., in communications planes) between the multiple RANs 402(1)-402(N) and the O-RUs 404A(1)-404A(P), 404B(1)-404B(P) in the RU clusters 404A, 404B that is otherwise not supported by a RAN standard (e.g., the O-RAN standard). In this manner, the shared O-RUs 404A(1)-404A(P), 404B(1)-404B(P) in the RU clusters 404A, 404B do not have to be designed and implemented in a customized fashion with functionality not included in the RAN standard implemented by the RAN system 1100 in order to handle and coordinate communications for multiple RANs 402(1)-402(N) to user devices, and vice versa. Thus, in an example, the neutral host agent device 418 also allows legacy RUs that are compatible with the RAN standard of the RAN system 1100 to be shared by the multiple RANs 402(1)-402(N) without having to be customized and/or replaced.

The RAN system 1100 in FIG. 11 in this example includes the RANs 402(1)-402(N) that are O-RANs 402(1)-402(N) that are compatible with the Open RAN standard set forth by the O-RAN Alliance referenced above. In this example, the O-CUs 308(1)-308(N) and the O-DUs 310(1)-310(N) in the respective O-RANs 402(1)-402(N) have been described in regard to the RAN system 300 in FIG. 3 and thus are not re-described. Common elements between the RAN system 300 in FIG. 3 and the RAN system 400 in FIG. 4, and the RAN system 1100 in FIG. 11 are shown with common element numbers.

The neutral host agent device 1118 in the RAN system 1100 in FIG. 11 is configured to discover the presence of each first O-RU 404A(1)-404A(P) in the first RU cluster 404A and each second O-RU 404B(1)-404B(P) in the second RU cluster 404B. The previously described O-RU discovery processes may be employed by the neutral host agent device 1118 to discover the presence of each first O-RU 404A(1)-404A(P) in the first RU cluster 404A and each second O-RU 404B(1)-404B(P) in the second RU cluster 404B. The neutral host agent device 1118 is configured to receive RU communication capability information 420A(1)-420A(P) for each first RU 404A(1)-404A(P) in the first RU cluster 404A and RU communication capability information 420(B1)-420B(P) for each second RU 404B(1)-404B(P) in the second RU cluster 404B to provide a total RU communication capability of the first and second O-RUs 404A(1)-404A(P), 404B(1)-404B(P). The neutral host agent device 1118 is also configured to determine one or more RU communication capabilities of the total RU communication capability for the first RU cluster 404A and the second RU cluster 404B to each be assigned to assigned O-DUs 310(1)-310(N) in the O-RANs 402(1)-402(N). Neutral host agent device 1118 is also configured to determine RU communication capabilities 422A(1)-422A(P), 422B(1)-422B(P) of the total RU communication capability in the RU clusters 404A, 404B to each be assigned to each O-DU 310(1)-310(N). The neutral host agent device 1118 is also configured to map channel routing for each assigned O-DU 310(1)-310(N) to the first RU cluster 404A and the second RU cluster 404B, based on received DU communication channel information 424(1)-424(N) for each assigned O-DU 310(1)-310(N) in response to the RU communication capabilities 422A(1)-422A(P), 422B(1)-422B(P) being assigned to the O-DU 310(1)-310(N). The neutral host agent device 1118 is also configured to communicate communication channel configurations to the RU clusters 404A, 404B based on the mapped channel routing 426 for communication between the RU clusters 404A, 404B and their assigned O-DUs 310(1)-310(N).

For example, as shown in FIG. 11, the first RU cluster 404A may be configured by the neutral host agent device 1118 to support three (3) cells CELL1, CELL2, and CELL3, wherein cells CELL1, CELL2 are for the first service provider SP$_1$, and cell CELL3 is for another service provider SP$_N$. The second RU cluster 404B may support one (1) cell CELL3.

With continuing reference to RAN system 1100 in FIG. 11, data packets related to the four planes will be handled as follows: C-Plane and U-Plane data packets in downlink communications signals 306D(1)-306D(N), originated at the respective DUs 310(1)-310(N) are communicated to the network gateway 1104 via the network switch 1102. The network gateway 1104 then multi-casts the downlink packets as downlink communications signals 306D(1)-306D(N) to the assigned O-RUs 404A(1)-404A(P), 404B(1)-404B(P) in the respective first and second RU clusters 404A, 404B, according to a configured channel routing 426, via the network switch 1102. U-Plane data packets in uplink communications signals 306AU(1)-306AU(P), 306BU(1)-306BU(P) originated at the O-RUs 404A(1)-404A(P), 404B(1)-404B(P) in the respective first and second RU clusters 404A, 404B are switched to the network gateway 1104 via the network switch 1102. The network gateway 1104 sums digitally the values of the uplink communications signals 306AU(1)-306AU(P), 306BU(1)-306BU(P) embedded at the U-plane data packets. The summation process can also include scaling and truncation. The network gateway 1104 can also be configured to compress and decompress values of the uplink communications signals 306AU(1)-306AU(P), 306BU(1)-306BU(P). For example, if values of the uplink communications signals 306AU(1)-306AU(P), 306BU(1)-306BU(P) are received compressed, the network gateway 1104 can also be configured to decompress these values before summation is performed, and then recompress the summation results of the values of the uplink communications signals 306AU(1)-306AU(P), 306BU(1)-306BU(P) in data packets sent to the assigned O-DU 310(1)-310(N). These processes can be done separately for O-RUs 404A(1)-404A(P), 404B(1)-404B(P) belonging to each RU cluster 404A, 404B. The summation result data packets are then sent to the assigned O-DU 310(1)-310(N), via the network switch 1102, and perceived by the DUs 310(1)-310(N), as they were originated by a single O-RU. Since the summation (including truncation and scaling) can be performed digitally, using an accurate and stable clock signal 1106 from the master clock 1108, these processes add a fixed delay that is perceived by the O-RAN elements as an additional, yet tolerable, length to the link between an O-RU 404A(1)-404A(P), 404B(1)-404B(P) and an O-DU 310(1)-310(N).

Figure 12:
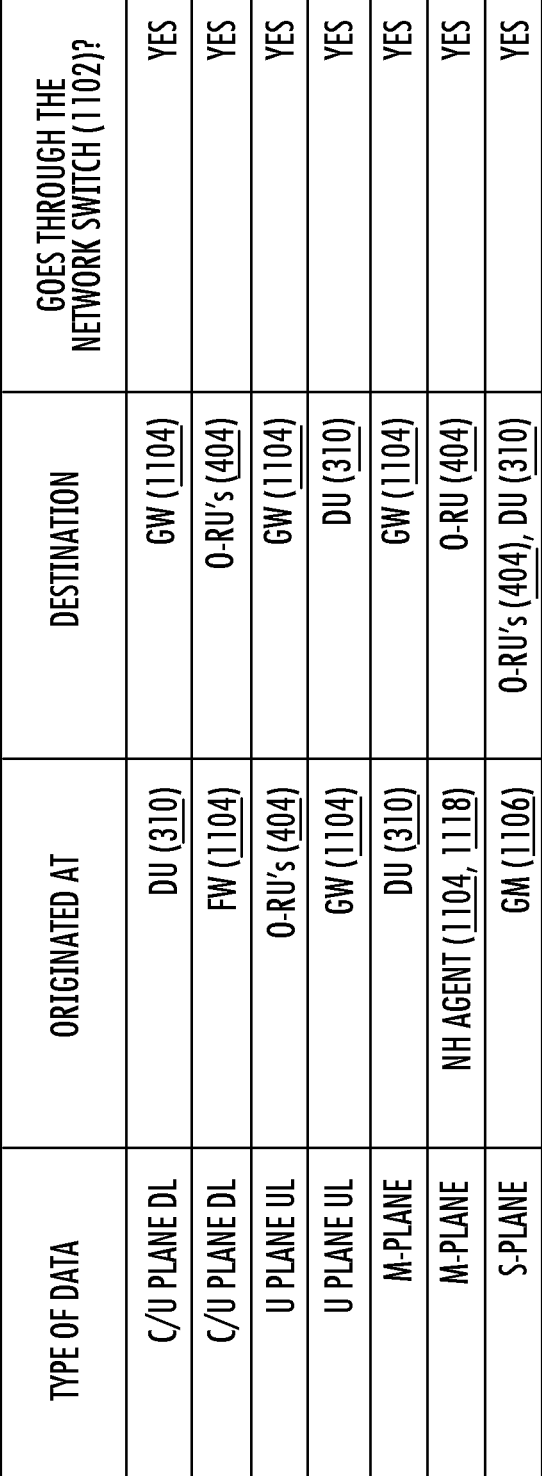
FIG. 12 is a communication diagram illustrating an exemplary communication signal flow to setup communications channels between the multiple shared RUs and a neutral host agent device and DUs in the RAN system, such as the RAN system in FIG. 11.

As shown in table 1200 in FIG. 12 an exemplary routing scheme for different types of data communicated with the O-RUs 404A(1)-404A(P), 404B(1)-404B(P) and the DUs 310(1)-310(N) in the RANs 402(1)-402(N) in the RAN system 1100 in FIG. 11, S-Plane data packets behave the same as in standard O-RAN Configuration, packets will be synchronized off of the clock signal 1106 of the master clock 1108 to the system elements in broadcast via the network switch 1102. As also shown in table 1200 in FIG. 12, M-Plane data packets originated at the DUs 310(1)-310(N) are terminated in the neutral host agent device 1118, which presents itself to each O-DU 310(1)-310(N) as a single O-RU. The neutral host agent device 1118 then opens additional M-Plane paths towards each RU cluster 404A, 404B and routes the M-Plane data packets to the O-RUs 404A(1)-404A(P), 404B(1)-404B(P) in the RU cluster 404A, 404B, presenting itself as a single DU. As also shown in table 1200 in FIG. 12, each of the C-Plane and U-Plane downlink packets in the downlink communications signals 306D and the U-Plane uplink packets in the uplink communications signals 306U go through the network switch 1102 twice. U-Plane uplink packets in uplink communications signals 306U go from the O-RUs 404A(1)-404A(P), 404B(1)-404B(P) to the network switch 1102, and then from the network switch 1102 to the network gateway 1104. Then, after being summed, the U-Plane uplink packets go back to the network switch 1102 and then go from the network switch 1102 to the DUs 310(1)-310(N). As also shown in table 1200 in FIG. 12, C-Plane and U-Plane downlink packets in the downlink communications signals 306D go from the DUs 310(1)-310(N) to the network switch 1102 and then from the network switch 1102 to the network gateway 1104 and then go back to the network switch 1102, and then go from the network switch 1102 to the O-RUs 404A(1)-404A(P), 404B(1)-404B(P). This multiple routing loads the network switch 1102 significantly.

Figure 13:
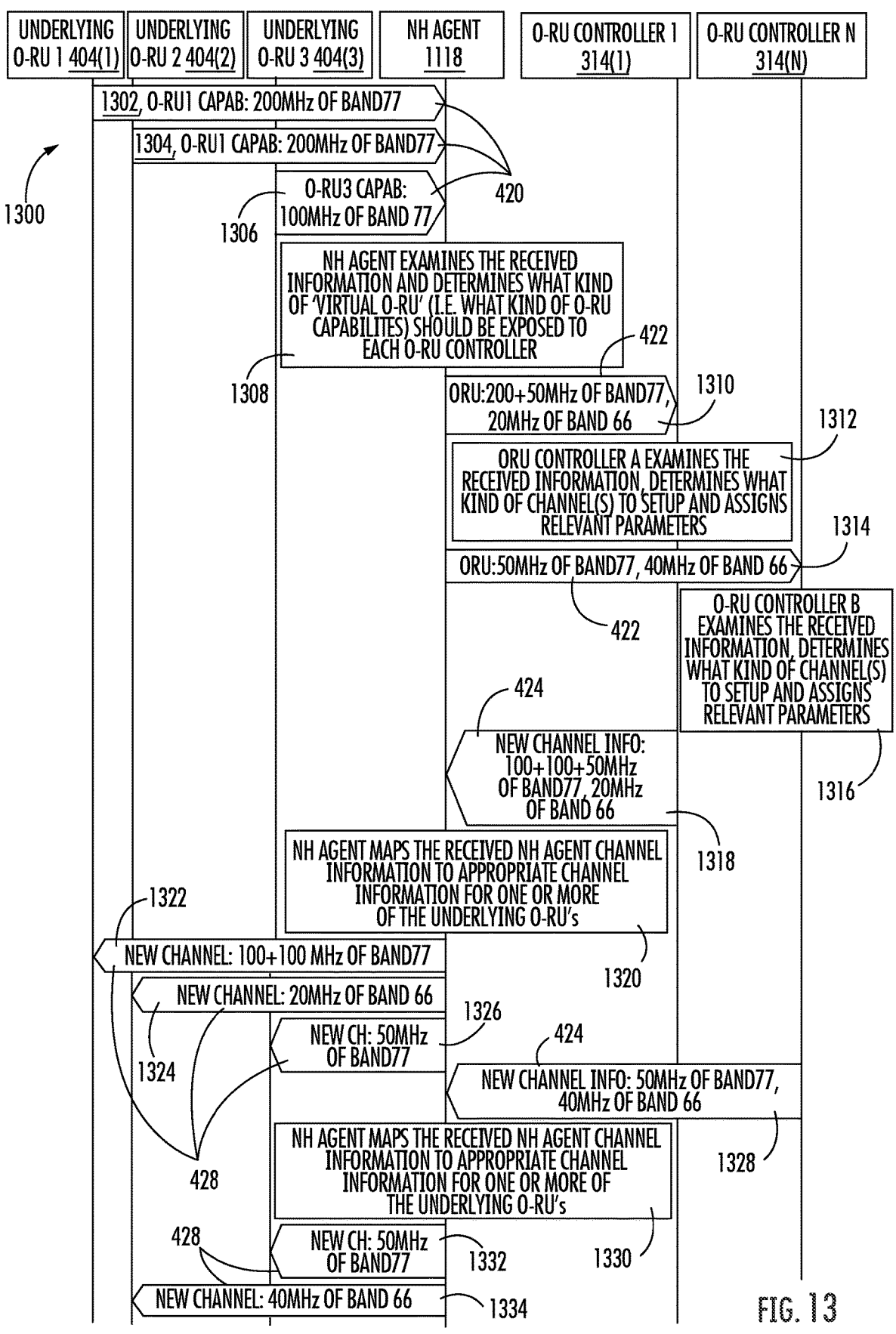
FIG. 13 is a table illustrating an exemplary routing scheme for different types of data communicated with the ORUs and the DUs in the RANs in FIG. 11.

FIG. 13 is a communication diagram 1300 illustrating an exemplary communication signal flow to setup communications channels between multiple shared O-RUs 404A(1)-404A(P), 404B(1)-404B(P) and the DUs 310(1)-310(N) using the neutral host agent device 1118 in RAN system 1100 in FIG. 11. In the communication diagram 1300, three (3) O-RUs 404(1)-404(3), that can be any of the O-RUs 404A(1)-404A(P), 404B(1)-404B(P) in RAN system 1100 in FIG. 11, are shown with their RU communication capabilities being mapped to two (2) O-RU controllers 314(1), 314(N) as an example.

In this regard, as shown in FIG. 13, after the discovery process, the shared O-RUs 404(1) shares its respective RU communication capabilities through the RU communication capability information 420 communicated to the neutral host agent device 418 (block 1302, 1304, 1306 in FIG. 13). In this example, the first O-RU 404(1) communicates a RU communication capability of a 200 MHz bandwidth in Band77, the second O-RU 404(2) communicates a RU communication capability of a 60 MHz bandwidth in Band66, and the third O-RU 404(3) communicates a RU communication capability of a 100 MHz bandwidth in Band77. The neutral host agent device 1118 receives the RU communication capability information 420 from the shared O-RUs 404(1)-404(3) and determines what kind of O-RU communication capabilities of the shared O-RU 404(1)-404(3) should be exposed to each O-RU controller 314(1)-314

(N) as assigned O-RU controllers 314(1)-314(N) of such O-RU communication capabilities (block 1308 in FIG. 13). The neutral host agent device 1118 then communicates the assigned RU communication capabilities 422 to its determined one or more assigned O-RU controllers 314(1)-314 (N) (blocks 1310, 1314 in FIG. 13). In this example, the RU communication capabilities 422 assigned to O-RU controller 314(1) is 200+50 MHz in Band77, and 20 MHz of Band66 (block 1310 in FIG. 13). The RU communication capabilities 422 assigned to O-RU controller 314(N) is 50 MHz in Band77, and 400 MHz of Band66 (block 1314 in FIG. 13). The respective O-RU controllers 314(1), 314(N) then examine its received RU communication capabilities 422 and determine what kind of communication channels to setup to be assigned to the shared O-RUs 404(1)-404(3) as well as relevant communications parameters (blocks 1312, 1316 in FIG. 13) as its DU communication channel information 424(1)-424(N). The O-RU controllers 314(1), 314 (N) then communicate the DU communication channel information 424(1)-424(N) to the neutral host agent device 1118 (block 1318, 1328 in FIG. 13). The neutral host agent device 1118 then maps channel routing for the O-RU controllers 314(1)-314(N) based on the received DU communication channel information 424 (block 1320, 1330 in FIG. 13). The neutral host agent device 1118 then configures the shared O-RUs 404(1)-404(3) and its communication channel configuration 428 based on the map channel routing for communications between the shared O-RUs 404(1)-404(3) and the O-RU controllers 314(1)-314(N) (block 1322-1326, 1332-1334 in FIG. 13). In this example, the neutral host agent device 1118 communicates communication channel configuration 428 of new channel 100+100 MHZ for Band77 for O-RU 404(1) (block 1322 in FIG. 13), new channel 20 MHZ of Band66 for O-RU 404(2) (block 1324 in FIG. 13), new channel 50 MHz of Band77 for O-RU 404(3) (block 1326 in FIG. 13), new channel 50 MHz of Band77 for O-RU 404(3) (block 1332 in FIG. 13), and new channel 40 MHz of Band66 for O-RU 404(2) (block 1334 in FIG. 13).

As discussed above for the RAN system 1100 in FIG. 11, C-Plane and U-Plane downlink packets in the downlink communications signals 306D go from the DUs 310(1)-310 (N) to the network switch 1102 and then from the network switch 1102 to the network gateway 1104 and then go back to the network switch 1102, and then go from the network switch 1102 to the O-RUs 404A(1)-404A(P), 404B(1)-404B (P). This multiple routing loads the network switch 1102 significantly. This routing load can be alleviated by an alternative RAN system shown as RAN system 1400 in FIG. 14. Common elements between the RAN system 1400 in FIG. 14 and the RAN system 1100 in FIG. 11 are shown with common element numbers.

The example RAN system 1100 in FIG. 11 is described above with the example of the neutral host agent device 1118 facilitating multiple DUs 310(1)-310(N) in the respective multiple RANs 402(1)-402(N) transparently interfacing with one or more of the RUs 404A(1)-404A(P), 404B(1)-404B(P) to access the shared communication capabilities of one or more of the RUs 404A(1)-404A(P), 404B(1)-404B (P). Note however that such is not limiting. As an alternative example, the neutral host agent device 1118 in the RAN system 1100 in FIG. 11 can facilitate multiple DUs 310(1)-310(N) in a single RAN among the RANs 402(1)-402(N) in the RAN system 900 in FIG. 9 interfacing with the neutral host agent device 418 to share the communication capabilities of one or more RUs 404A(1)-404A(P), 404B(1)-404B (P). As another alternative example, the neutral host agent device 1118 in the RAN system 1100 in FIG. 11 can facilitate in a single DU 310(1)-310(N) in a single RAN of the RANs 402(1)-402(N) transparently interfacing with one or more of the RUs 404A(1)-404A(P), 404B(1)-404B(P) to access the communication capabilities of one or more of the RUs 404A(1)-404A(P), 404B(1)-404B(P). As another alternative example, the neutral host agent device 1118 in the RAN system 1100 in FIG. 11 can facilitate a single DU 310(1)-310(N) among the multiple respective RAN 402(1)-402(N) transparently interfacing one or more of the RUs 404A(1)-404A(P), 404B(1)-404B(P) to access the communication capabilities of one or more of the RUs 404A(1)-404A(P), 404B(1)-404B(P). The neutral host agent device 1118 in the RAN system 1100 in FIG. 11 is configured to respond and handle each of these examples, because of the neutral host agent device's 1118 discovery process to discover the DUs 310(1)-310(N) and the RUs 404A(1)-404A(P), 404B(1)-404B(P) and sharing the discovered communication capabilities and communications assignments for the discovered DUs 310(1)-310(N) and the RUs 404A(1)-404A(P), 404B(1)-404B(P).

Figure 14:
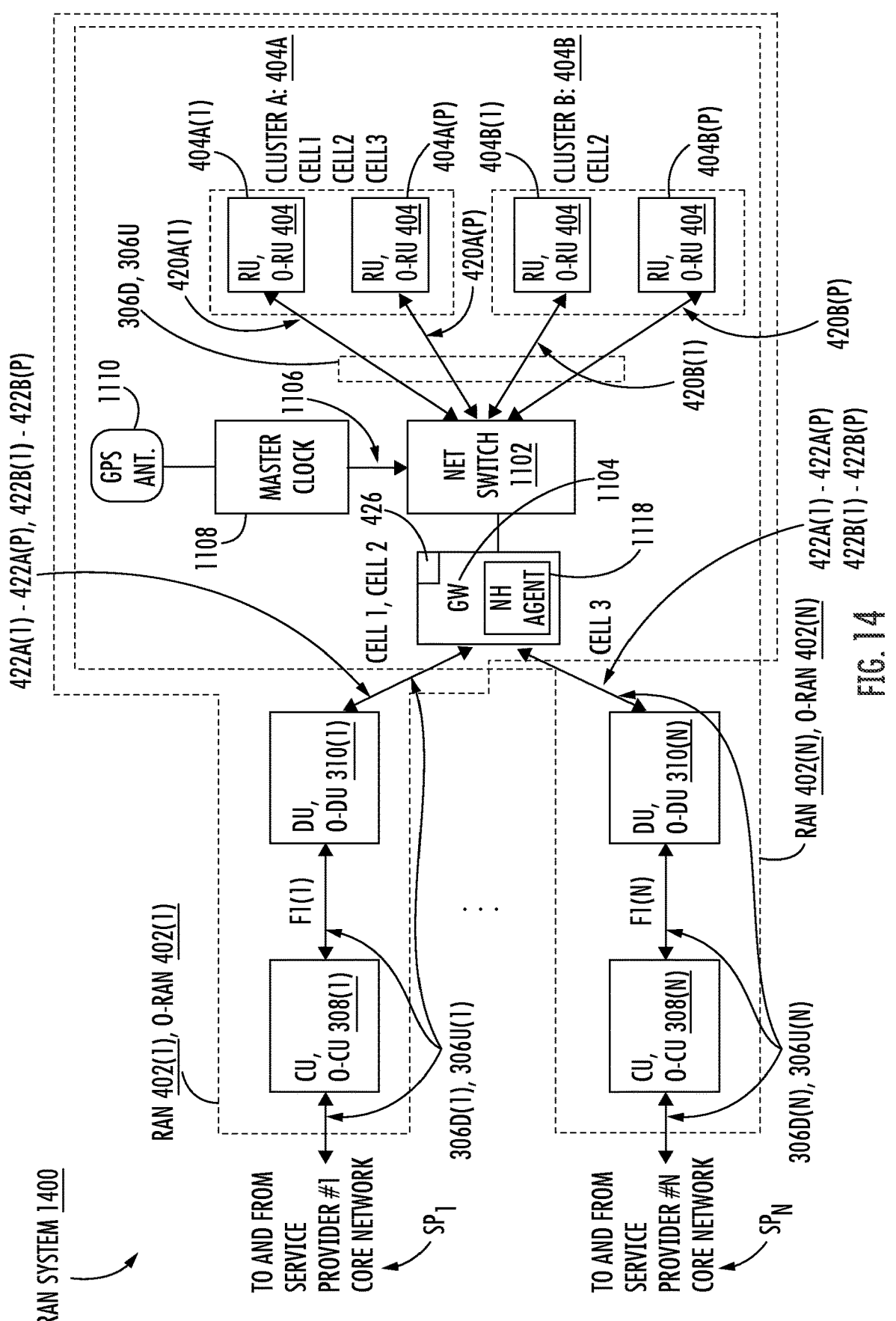
FIG. 14 is another exemplary RAN system that includes multiple RANs implemented according to a RAN standard (e.g., O-RAN standard) and each configured to support a different service provider, wherein each RAN includes DUs configured to interface with multiple shared RU clusters through an intermediary neutral host agent device that includes a serial connected FHGW and Ethernet switch.

In the RAN system 1400 in FIG. 14, the C-Plane and U-Plane downlink packets in the downlink communications signals 306D and the U-Plane uplink data packets in the uplink communications signals 306U go through the network switch 1102 only once, as shown in table 1500 in FIG. 15 illustrating communication routing. The U-Plane uplink data packets in the uplink communications signals 306U go from the O-RUs 404A(1)-404A(P), 404B(1)-404B(P) to the network switch 1102 and then from the network switch 1102 to the network gateway 1104. Then, then after being summed, they are communicated from the network gateway 1104 to the DUs 310(1)-310(N). C- and U-Plane downlink data packets in the downlink communications signals 306D go from the DUs 310(1)-310(N) to the network gateway 1104. Then, they are communicated to the network switch 1102 and then from the network switch 1102 to their assigned O-RUs 404A(1)-404A(P), 404B(1)-404B(P). The S-Plane data packets behave the same in a standard O-RAN configuration. S-Plane data packets run from the master clock 1108 to the system elements in broadcast via the network switch 1102. DUs 310(1)-310(N) originated M-Plane data packets are terminated in the neutral host agent device 1118, which presents itself to each O-DU 310(1)-310(N) to as a single O-RU. The neutral host agent device 1118 then opens additional M-Plane paths towards the O-RUs 404A(1)-404A(P), 404B(1)-404B(P), and routes the M-Plane data packets to the O-RUs 404A(1)-404A(P), 404B(1)-404B(P), presenting itself as an O-DU 310(1)-310(N).

The example RAN system 1400 in FIG. 14 is described above with the example of the neutral host agent device 1118 facilitating multiple DUs 310(1)-310(N) in the respective multiple RANs 402(1)-402(N) transparently interfacing with one or more of the RUs 404A(1)-404A(P), 404B(1)-404B(P) to access the shared communication capabilities of one or more of the RUs 404A(1)-404A(P), 404B(1)-404B(P). Note however, that such is not limiting. As an alternative example, the neutral host agent device 1118 in the RAN system 1400 in FIG. 14 can facilitate multiple DUs 310(1)-310(N) in a single RAN among the RANs 402(1)-402(N) in the RAN system 900 in FIG. 9 interfacing with the neutral host agent device 418 to share the communication capabilities of one or more RUs 404A(1)-404A(P), 404B(1)-404B(P). As another alternative example, the neutral host agent device 1118 in the RAN system 1400 in FIG. 14 can facilitate in a single DU 310(1)-310(N) in a single RAN of the RANs 402(1)-402(N) transparently interfacing with one or more of the RUs 404A(1)-404A(P), 404B(1)-404B(P) to access the communication capabilities of one or more of the RUs 404A(1)-404A(P), 404B(1)-404B(P). As another alternative example, the neutral host agent device 1118 in the RAN system 1400 in FIG. 14 can facilitate a single DU 310(1)-310(N) among the multiple respective RAN 402(1)-402(N) transparently interfacing one or more of the RUs 404A(1)-404A(P), 404B(1)-404B(P) to access the communication capabilities of one or more of the RUs 404A(1)-404A(P), 404B(1)-404B(P). The neutral host agent device 1118 in the RAN system 1400 in FIG. 14 is configured to respond and handle each of these examples because of the neutral host agent device's 1118 discovery process to discover the DUs 310(1)-310(N) and the RUs 404A(1)-404A(P), 404B(1)-404B(P) and sharing the discovered communication capabilities and communications assignments for the discovered DUs 310(1)-310(N) and the RUs 404A(1)-404A(P), 404B(1)-404B(P).

Figure 16:
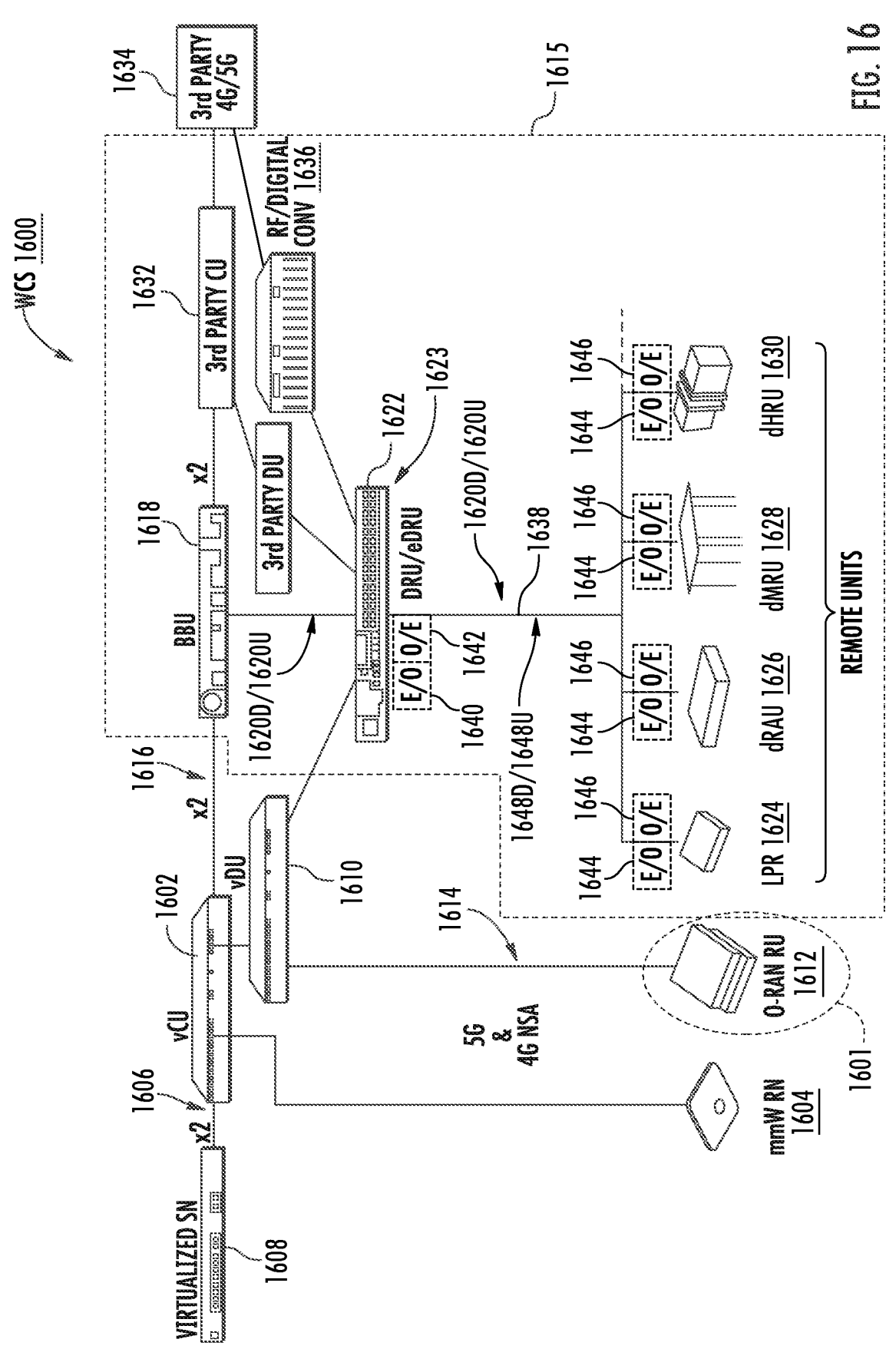
FIG. 16 is a schematic diagram of an exemplary RAN system, including but not limited to the RAN system of FIGS. 4, 9, 11, and 14, wherein the RAN system includes multiple RANs implemented according to a RAN standard (e.g., O-RAN standard), each configured to transparently interface with a shared RU(s) through an intermediary neutral host agent device.

FIG. 16 is a schematic diagram of an exemplary WCS 1600 that can include one or RAN systems implemented according to a RAN standard (e.g., O-RAN standard), including but not limited to the RAN systems 400, 900, 1100, 1400 of FIGS. 4, 9, 11, and 14, and each configured to transparently interface with shared RU(s) through an intermediary neutral host agent device according to any of the embodiments disclosed herein. The WCS 1600 supports both legacy 4G LTE, 4G/5G non-standalone (NSA), and 5G standalone communications systems. As shown in FIG. 16, a centralized services node 1602 (which can be a CU described above) is provided that is configured to interface with a core network to exchange communications data and distribute the communications data as radio signals to remote units, which can be the RUs described above. In this example, the centralized services node 1602 is configured to support distributed communications services to a mmWave radio node 1604. The mmWave radio node 1604 is an example of a wireless device that can be configured to selectively control whether received transmit channels are transmitted through an antenna array. Although only one mmWave radio node 1604 is shown in FIG. 16, it should be appreciated that the WCS 1600 can be configured to include additional mmWave radio nodes 1604, as needed. The functions of the centralized services node 1602 can be virtualized through an x2 interface 1606 to another services node 1608. The centralized services node 1602 can also include one or more internal radio nodes that are configured to be interfaced with a DU 1610 (which can be a virtual DU and/or a DU described above) to distribute communications signals (e.g., communications channels) to one or more O-RAN RUs 1612 that are configured to be communicatively coupled through an O-RAN interface 1614. The O-RAN RUs 1612 are another example of a wireless device that can be configured to selectively control whether received transmit channels are transmitted through an antenna array. The O-RAN RUs 1612 are each configured to communicate downlink and uplink communications signals in the coverage cell(s) 1601.

The centralized services node 1602 can also be interfaced with a DCS 1615 through an x2 interface 1616. Specifically, the centralized services node 1602 can be interfaced with a digital baseband unit (BBU) 1618 in the DCS that can provide a digital signal source to the centralized services node 1602. The digital BBU 1618 may be configured to provide a signal source to the centralized services node 1602 to provide electrical downlink communications signals 1620D (electrical downlink communications signals 1620D can include downlink channels) to a digital routing unit (DRU) 1622 as part of a digital DAS. The digital BBU 1618 may be configured to include a neutral host agent 1623 like the neutral host agent devices 418, 1118 in FIGS. 4, 9, 11, and 14 may be provided that is configured to transparently interface a shared RU(s) to a RAN according to a RAN standard (e.g., O-RAN standard). The DRU 1626 is configured to split and distribute the electrical downlink communications signals 1620D to different types of remote wireless devices, including a low-power remote unit (LPR) 1624, a radio antenna unit (dRAU) 1626, a mid-power remote unit (dMRU) 1628, and/or a high-power remote unit (dHRU) 1630. The DRU 1622 is also configured to combine electrical uplink communications signals 1620U (electrical uplink communications signals 1620U can include uplink channels) received from the LPR 1624, the dRAU 1626, the dMRU 1628, and/or the dHRU 1630 and provide the combined electrical uplink communications signals 1620U to the digital BBU 1618. The digital BBU 1618 is also configured to interface with a third-party central unit 1632 and/or an analog source 1634 through a radio frequency (RF)/digital converter 1636.

The DRU 1622 may be coupled to the LPR 1624, the dRAU 1626, the dMRU 1628, and/or the dHRU 1630 via an optical fiber-based communication medium 1638. In this regard, the DRU 1622 can include a respective electrical-to-optical (E/O) converter 1640 and a respective optical-to-electrical (O/E) converter 1642. Likewise, each of the LPR 1624, the dRAU 1626, the dMRU 1628, and the dHRU 1630 can include a respective E/O converter 1644 and a respective O/E converter 1646.

The E/O converter 1640 at the DRU 1622 is configured to convert the electrical downlink communications signals 1620D into optical downlink communications signals 1620D for distribution to the LPR 1624, the dRAU 1626, the dMRU 1628, and/or the dHRU 1630 via the optical fiber-based communications medium 1642. The O/E converter 1650 at each of the LPR 1624, the dRAU 1626, the dMRU 1628, and/or the dHRU 1630 is configured to convert the optical downlink communications signals 1620D back to the electrical downlink communications signals 1620D. The E/O converter 1644 at each of the LPR 1624, the dRAU 1626, the dMRU 1628, and the dHRU 1630 is configured to convert the electrical uplink communications signals 1620U into optical uplink communications signals 1620U. The O/E converter 1642 at the DRU 1622 is configured to convert the optical uplink communications signals 1620U back to the electrical uplink communications signals 1620U.

Figure 17:
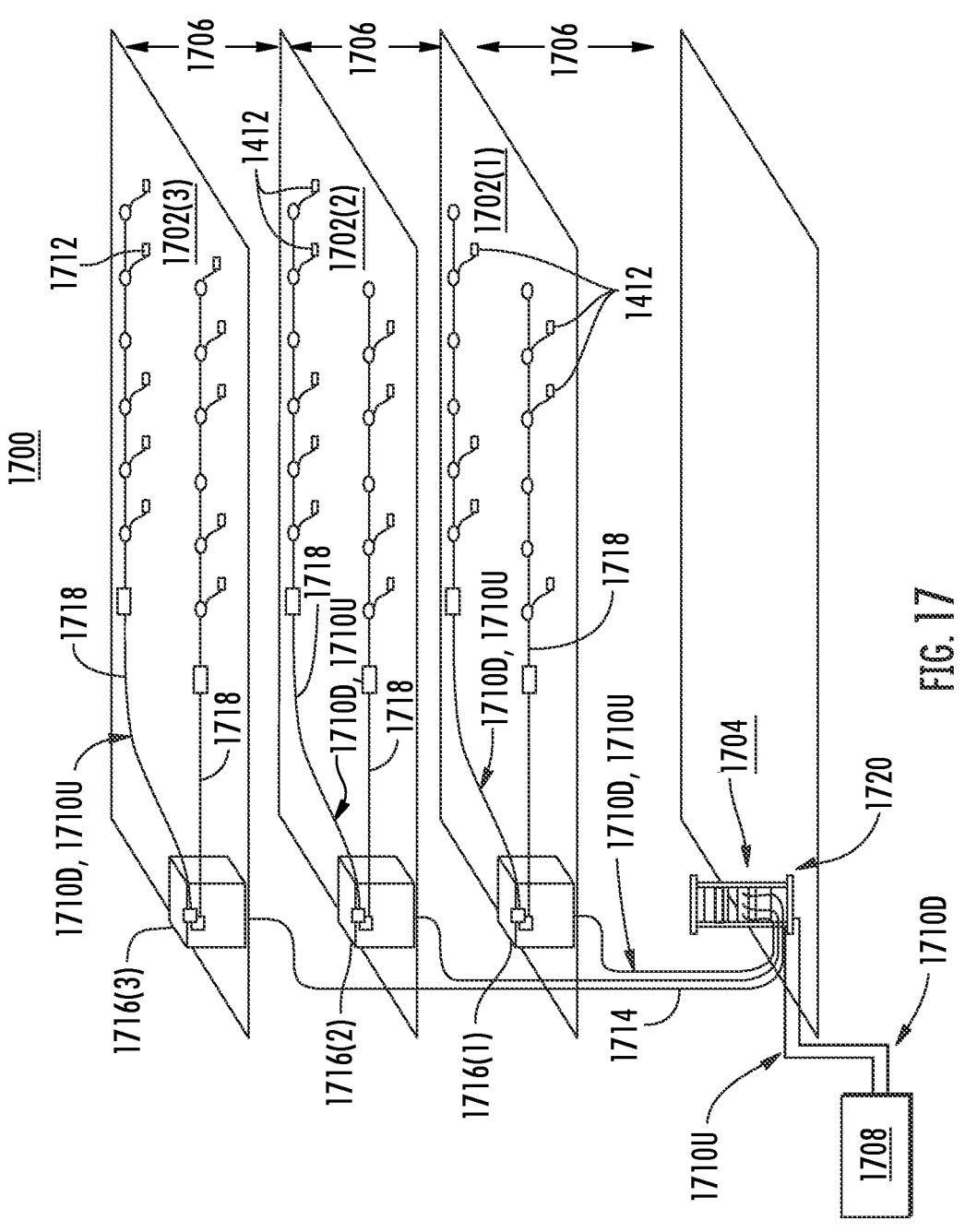
FIG. 17 is a partial schematic cut-away diagram of an exemplary building infrastructure that includes a RAN system, including but not limited to the RAN system of FIGS. 4, 9, 11, and 14, wherein the RAN system includes multiple RANs implemented according to a RAN standard (e.g., O-RAN standard), each configured to transparently interface with a shared RU(s) through an intermediary neutral host agent device.

FIG. 17 is a partial schematic cut-away diagram of an exemplary building infrastructure 1700 that includes an exemplary RAN system 1702, including but not limited to the RAN systems 400, 900, 1100, 1400 of FIGS. 4, 9, 11 and 14, wherein the RAN system 1702 includes multiple RANs 1704 implemented according to a RAN standard (e.g., O-RAN standard) and each configured to transparently interface with shared RUs through an intermediary neutral host agent device. The building infrastructure 1700 in this embodiment includes a first (ground) floor 1702(1), a second floor 1702(2), and a third floor 1702(3). The floors 1702(1)-1702(3) are serviced by one or more RANs 1704 to provide antenna coverage areas 1706 in the building infrastructure 1700. The RANs 1704 are communicatively coupled to a core network 1708 to receive downlink communications signals 1710D (downlink communications signals 1710D can include downlink channels) from the core network 1708. The RANs 1704 are communicatively coupled to a respective plurality of RUs 1712 to distribute the downlink communications signals 1710D to the RUs 1712 and to receive uplink communications signals 1710U (uplink communications signals 1710U can include uplink channels) from the RUs 1712, as previously discussed above. Any RU 1712 can be shared by any of the multiple RANs 1704. A neutral host agent 1720 like the neutral host agent devices 418, 1118 in FIGS. 4, 9, 11, and 14 may be provided that is configured to transparently interface a shared RU(s) 1712 to the RAN 1704 according to a RAN standard (e.g., O-RAN standard).

The downlink communications signals 1710D and the uplink communications signals 1710U communicated between the RANs 1704 and the RUs 1712 are carried over a riser cable 1714. The riser cable 1714 may be routed through interconnect units (ICUs) 1716(1)-1716(3) dedicated to each of the floors 1702(1)-1702(3) that route the downlink communications signals 1710D and the uplink communications signals 1710U to the RUs 1712 and also provide power to the RUs 1712 via array cables 1718.

Figure 18:
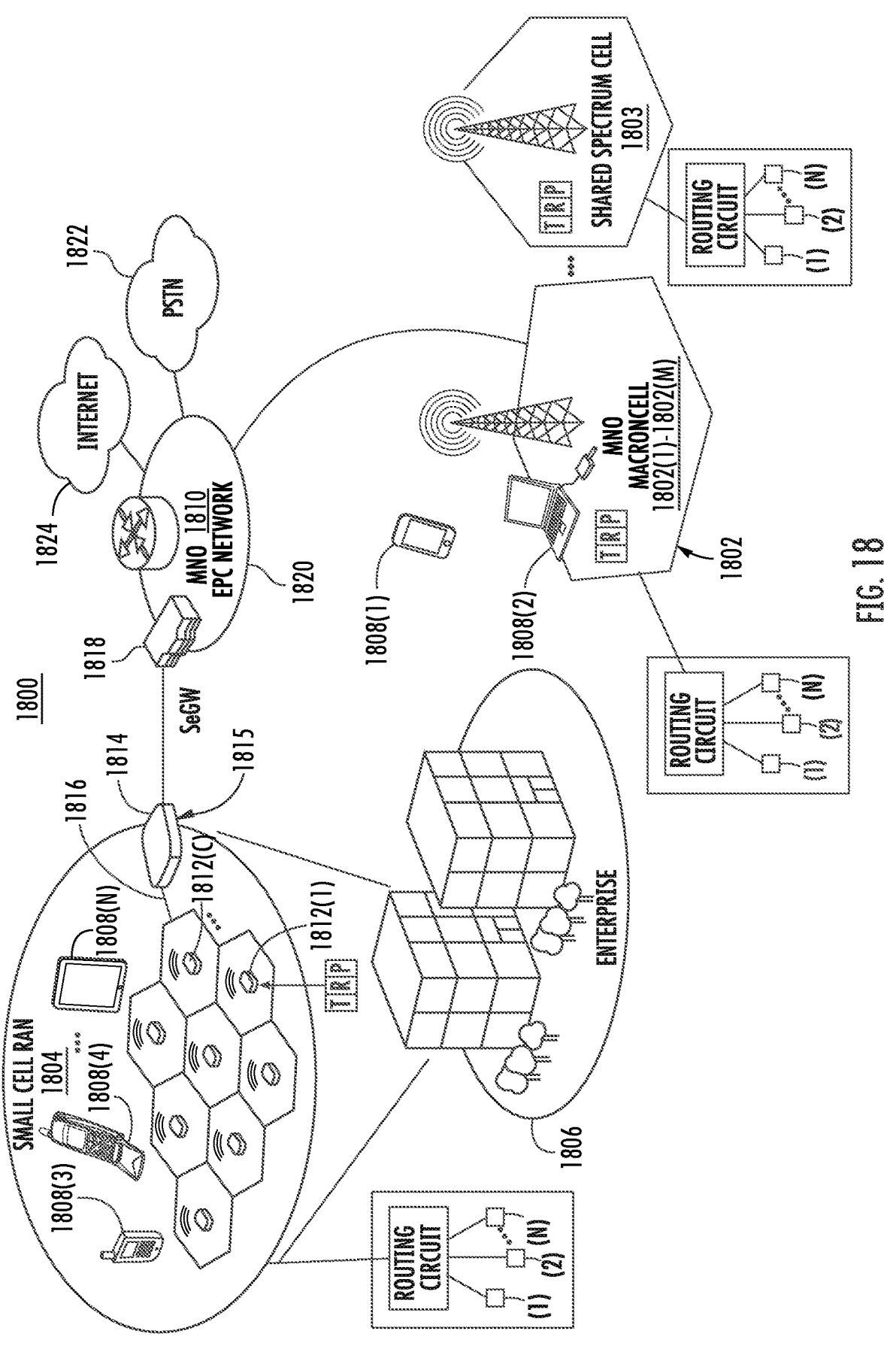
FIG. 18 is a schematic diagram of an exemplary mobile telecommunications environment that can include a RAN system, including but not limited to the RAN system of FIGS. 4, 9, 11, and 14, wherein the RAN system includes multiple RANs implemented according to a RAN standard (e.g., O-RAN standard), each configured to transparently interface with a shared RU(s) through an intermediary neutral host agent device.

FIG. 18 is a schematic diagram of an exemplary mobile telecommunications RAN system 1800 (also referred to as "RAN system 1800") that can include, but is not limited to, the RAN systems 400, 900, 1100, 1400 of FIGS. 4, 9, 11 and 14, wherein the RAN system 1800 includes multiple RANs implemented according to a RAN standard (e.g., O-RAN standard) and each configured to transparently interface with shared RUs through an intermediary neutral host agent device.

In this regard, RAN system 1800 includes exemplary macrocell RANs 1802(1)-1802(M) ("macrocells 1802(1)-1802(M)") and an exemplary small cell RAN 1804 located within an enterprise environment 1806 and configured to service mobile communications between a user mobile communications device 1808(1)-1808(N) to a mobile network operator (MNO) 1810. A serving RAN for the user mobile communications devices 1808(1)-1808(N) is a RAN or cell in the RAN in which the user mobile communications devices 1808(1)-1808(N) have an established communications session with the exchange of mobile communications signals for mobile communications. Thus, a serving RAN may also be referred to herein as a serving cell. For example, the user mobile communications devices 1808(3)-1808(N) in FIG. 18 are being serviced by the small cell RAN 1804, whereas the user mobile communications devices 1808(1) and 1808(2) are being serviced by the macrocell 1802. macrocell 1802 is an MNO macrocell in this example. The macrocell 1802 can be or include a wireless device(s) that can be configured to selectively control whether received transmit channels are transmitted through an antenna array of the wireless device. However, a shared spectrum RAN 1803 (also referred to as "shared spectrum cell 1803") includes a macrocell in this example and supports communications on frequencies that are not solely licensed to a particular MNO, such as CBRS for example, and thus may service user mobile communications devices 1808(1)-1808 (N) independent of a particular MNO. The macrocell 1802 can be or include a wireless device(s) that can be configured to selectively control whether received transmit channels are transmitted through an antenna array of the wireless device. The macrocell 1802 can be a wireless device that can be configured to selectively control whether received transmit channels are transmitted through an antenna array of the wireless device. For example, the shared spectrum cell 1803 may be operated by a third party that is not an MNO and wherein the shared spectrum cell 1803 supports CBRS. The MNO macrocell 1802, the shared spectrum cell 1803, and the small cell RAN 1804 may be neighboring radio access systems to each other, meaning that some or all can be in proximity to each other such that a user mobile communications device 1808(3)-1808(N) may be able to be in communications range of two or more of the MNO microcell(s) 1802, the shared spectrum cell 1803, and the small cell RAN 1804 depending on the location of the user mobile communications devices 1808(3)-1808(N).

In FIG. 18, the RAN system 1800 in this example is arranged as an LTE system as described by the Third Generation Partnership Project (3GPP) as an evolution of the GSM/UMTS standards (Global System for Mobile Communication/Universal Mobile Telecommunications System). It is emphasized, however, that the aspects described herein may also be applicable to other network types and protocols. The RAN system 1800 includes the enterprise environment 1806 in which the small cell RAN 1804 is implemented. The small cell RAN 1804 includes a plurality of small cell radio nodes 1812(1)-1812(C), which are wireless devices that can be configured to selectively control whether received transmit channels are transmitted through an antenna array of the wireless devices. Each small cell radio node 1812(1)-1812 (C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 18, the small cell RAN 1804 includes one or more service nodes (represented as a single services node 1814) that manage and control the small cell radio nodes 1812(1)-1812(C). In alternative implementations, the management and control functionality may be incorporated into a radio node, distributed among nodes, or implemented remotely (i.e., using infrastructure external to the small cell RAN 1804). The small cell radio nodes 1812(1)-1812(C) are coupled to the services node 1814 over a direct or local area network (LAN) connection 1816 as an example, typically using secure IPsec tunnels. The small cell radio nodes 1812(1)-1812(C) can include multi-operator radio nodes. A neutral host agent device 1815 like the neutral host agent devices 418, 1118 in FIGS. 4, 9, 11, and 14 could be provided between the services node 1814 and the small cell radio nodes 1812(1)-1812(C) to transparently manage communications between the services node 1814 and shared small cell radio nodes 1812(1)-1812(C). The services node 1814 aggregates voice and data traffic from the small cell radio nodes 1812(1)-1812(C) and provides connectivity over an IPsec tunnel to a security gateway (SeGW) 1818 in a network 1820 (e.g., evolved packet core (EPC) network in a 4G network, or 5G Core in a 5G network) of the MNO 1810. The network 1820 is typically configured to communicate with a public switched telephone network (PSTN) 1822 to carry circuit-switched traffic, as well as for communicating with an external packet-switched network such as the Internet 1824.

The RAN system 1800 also generally includes a node (e.g., eNodeB or gNodeB) base station, or "macrocell" 1802. The radio coverage area of the macrocell 1802 is typically much larger than that of a small cell, where the extent of coverage often depends on the base station configuration and the surrounding geography. Thus, a given user mobile communications device 1808(3)-1808(N) may achieve connectivity to the network 1820 (e.g., EPC network in a 4G network, or 5G Core in a 5G network) through either a macrocell 1802 or small cell radio node 1812(1)-1812(C) in the small cell RAN 1804 in the RAN system 1800. The neutral host agent device 1815 like the neutral host agent devices 418, 1118 in FIGS. 4, 9, 11, and 14 could be provided between the macrocell 1802 and the small cell RAN 1804 to transparently manage communications between the macrocell 1802 and the small cell RAN 1804.

Figure 19:
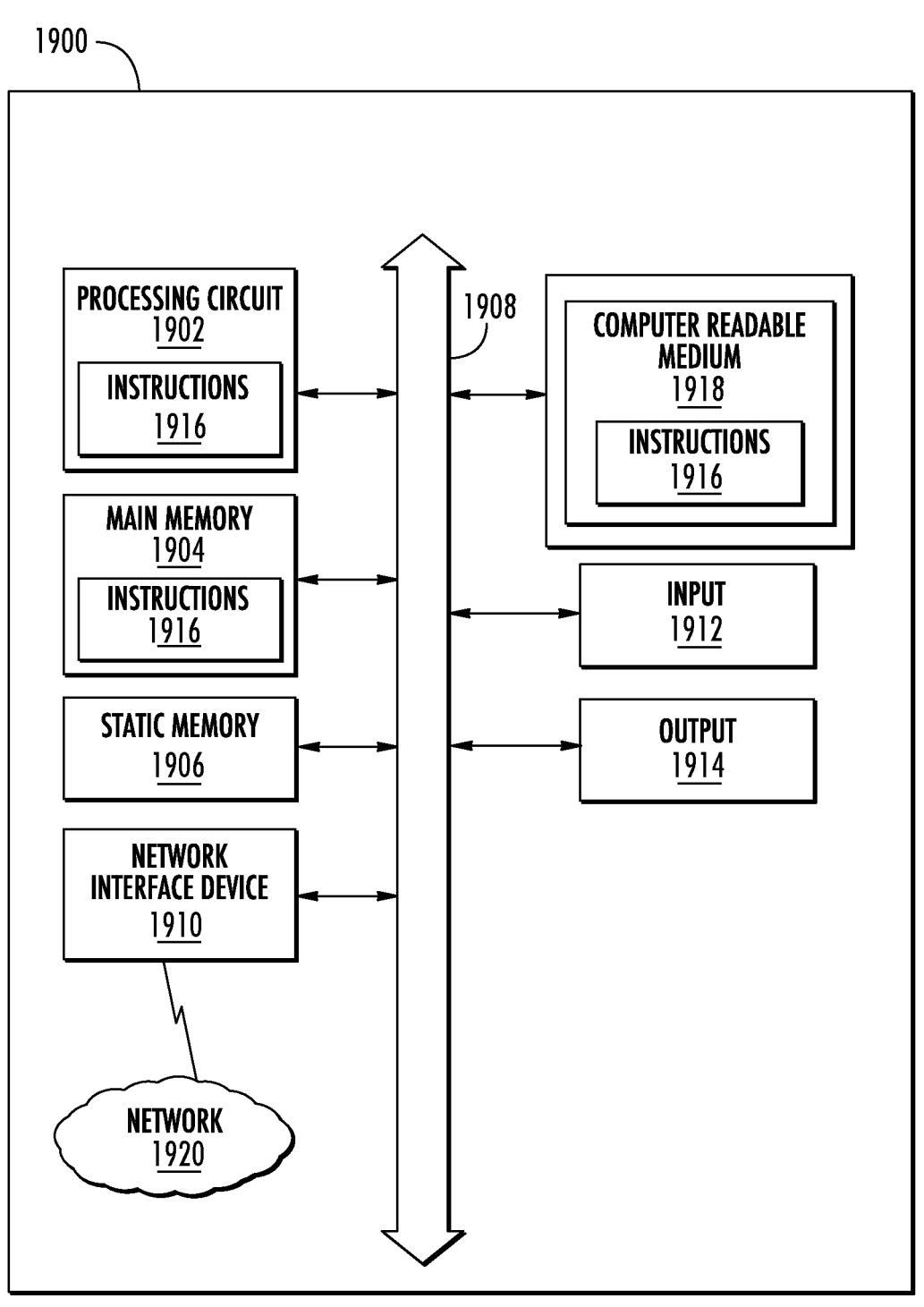
FIG. 19 is a schematic diagram of a representation of an exemplary computer system that can be included in or interfaced with any of the components in a WCS, including but not limited to the RAN system, including but not limited to the RAN system of FIGS. 4, 9, 11, and 14, wherein the RAN system includes multiple RANs implemented according to a RAN standard (e.g., O-RAN standard), each configured to transparently interface with shared RU(s) through an intermediary neutral host agent device.

Any of the circuits, components, devices, modules described herein, including but not limited to neutral host agent devices 418, 1118 in FIGS. 4, 9, 11, and 14 can include or be included in a computer system 1900, such as that shown in FIG. 19, to carry out their functions and operations as described herein. With reference to FIG. 19, the computer system 1900 includes a set of instructions for causing the multi-operator radio node component(s) to provide its designed functionality and the circuits discussed above. The multi-operator radio node component(s) may be connected (e.g., networked) to other machines in a LAN, an intranet, an extranet, or the Internet. The multi-operator radio node component(s) may operate in a client-server network environment or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1900 in this embodiment includes a processing circuit or processor 1902, a main memory 1904 (e.g., read-only memory (ROM), flash memory, dynamic random-access memory (DRAM) such as synchronous DRAM (SDRAM), etc.), and a static memory 1906 (e.g., flash memory, static random access memory (SRAM), etc.), which may communicate with each other via a data bus 1908. Alternatively, the processing circuit 1902 may be connected to the main memory 1904 and/or static memory 1906 directly or via some other connectivity means. The processing circuit 1902 may be a controller, and the main memory 1904 or static memory 1906 may be any type of memory.

The processing circuit 1902 represents one or more general-purpose processing circuits such as a microprocessor, central processing unit, or the like. More particularly, the processing circuit 1902 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1902 is configured to execute processing logic in instructions 1916 for performing the operations and steps discussed herein.

The computer system 1900 may further include a network interface device 1910. The computer system 1900 also may or may not include an input 1912 to receive input and selections to be communicated to the computer system 1900 when executing instructions. The computer system 1900 also may or may not include an output 1914, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1900 may or may not include a data storage device that includes instructions 1916 stored in a computer-readable medium 1918. The instructions 1916 may also reside, completely or at least partially, within the main memory 1904 and/or within the processing circuit 1902 during execution thereof by the computer system 1900, the main memory 1904 and the processing circuit 1902 also constituting the computer-readable medium 1918. The instructions 1916 may further be transmitted or received over a network 1920 via the network interface device 1910.

While the computer-readable medium 1918 is shown in an exemplary embodiment to be a single medium, the term "computer-readable medium" should be taken to include a single medium or multiple media (e.g., a centralized or distributed database and/or associated caches and servers) that store the one or more sets of instructions. The embodiments disclosed herein may be provided as a computer program product or software that may include a machine-readable medium (or computer-readable medium) having stored thereon instructions, which may be used to program a computer system (or other electronic devices) to perform a process according to the embodiments disclosed herein. The term "computer-readable medium" and "machine-readable medium" shall also be taken to include any medium that is capable of storing, encoding or carrying a set of instructions for execution by the processing circuit and that cause the processing circuit to perform any one or more of the methodologies of the embodiments disclosed herein. For example, a computer-readable medium or a machine-readable medium includes a machine-readable storage medium (e.g., read-only memory ("ROM"), random access memory ("RAM"), magnetic disk storage medium, optical storage medium, flash memory devices, etc.), solid-state memories, optical media, magnetic media, and the like. Notwithstanding this broad definition, specifically excluded from this definition are electromagnetic carrier waves or other signals that have information encoded thereon or therein but lack tangible form.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

Unless specifically stated otherwise and as apparent from the previous discussion, it is appreciated that throughout the description, discussions utilizing terms such as "processing," "computing," "determining," "displaying," or the like refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components and/or systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented as electronic hardware, instructions stored in memory or in another computer-readable medium and executed by a processor or other processing device, or combinations of both. The various illustrative logical blocks, modules, and circuits described in connection with the embodiments disclosed herein may be implemented with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein, as examples. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips that may be references throughout the above description may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

We claim:

1. A host agent device, comprising:

a controller configured to be communicatively coupled to one or more remote units (RUs) and one or more distribution units (DUs), each DU of the one or more DUs included in a radio access network (RAN) among one or more RANs;

the controller configured to:

discover the presence of one or more RUs;

receive RU communication capability information for the one or more RUs;

determine a total RU communication capability based on the received RU communication capability information for the one or more RUs;

assign one or more subsets of the total RU communication capability to at least one DU of the one or more DUs; and communicate the assigned one or more subsets of the total RU communication capability to the at least one DU.

2. The host agent of claim 1, wherein the controller is further configured to:

receive DU communication channel information for the at least one DU, based on the one or more subsets of the total RU communication capability assigned to the at least one DU.

3. The host agent device of claim 2, wherein the controller is further configured to:

map channel routing for the at least one DU to the one or more RUs, based on the received DU communication channel information for the at least one DU.

4. The host agent device of claim 3, wherein the controller is further configured to:

communicate at least one communication channel configuration to the one or more RUs based on map channel routing, for communication between the one or more RUs and the at least one DU.

5. The host agent device of claim 3, wherein the controller is configured to:

receive an uplink channel from an RU of the one or more RUs; and communicate the uplink channel from the RU to at least one DU mapped to the uplink channel based on the mapped channel routing.

6. The host agent device of claim 3, wherein the controller is configured to:

receive a downlink channel from the at least one DU; and communicate the downlink channel from the at least one DU to the one or more RUs mapped to the downlink channel based on the mapped channel routing.

7. The host agent device of claim 1, wherein the controller is configured to:

receive the RU communication capability information further comprising one or more frequency bands and a bandwidth for each of one or more frequency bands for the one or more RUs as part of the total RU communication capability; and receive the DU communication channel information comprising at least a portion of a bandwidth of at least one frequency band of the one or more frequency bands for at least one DU, based on the one or more subsets of the total RU communication capability assigned to the one or more DUs.

8. The host agent device of claim 3, wherein the controller is configured to:

receive the RU communication capability information by being configured to receive a first frequency band having a first bandwidth from a first RU of the one or more RUs as part of the total RU communication capability for the one or more RUs;

receive DU communication channel information by being configured to:

receive a first portion of the first bandwidth for a first DU of the at least one DU, based on the one or more subsets of the total RU communication capability communicated to the one or more DUs; and receive a second portion of the second bandwidth for a second DU for the at least one DU, based on the one or more subsets of the total RU communication capability communicated to the one or more DUs; and map channel routing by being configured to:

map the first portion of the first bandwidth for the first DU to the first RU, based on the received DU communication channel information from the first DU; and map the second portion of the second bandwidth for the second DU to the first RU, based on the received DU communication channel information from the second DU.

9. The host agent device of claim 3, wherein the controller is configured to:

receive RU communication capability information by being configured to:

receive a first frequency band having a first bandwidth from a first RU of the at least one DU as part of the total RU communication capability assigned to the one or more RUs; and receive a second frequency band having a second bandwidth from a second RU of the at least one DU as part of the total RU communication capability assigned to the one or more RUs;

receive DU communication channel information by being configured to:

receive at least a first portion of the first bandwidth of the first frequency band for a first DU of the at least one DU, based on the one or more subsets of the total RU communication capability communicated to the one or more DUs; and receive at least a second portion of the second bandwidth for a second DU of the at least one DU, based on the one or more subsets of the total RU communication capability communicated to the one or more DUs; and map channel routing by being configured to:

map the at least a first portion of the first bandwidth for the first DU to the first RU, based on the received DU communication channel information from the first DU; and map the at least a second portion of the second bandwidth for the first DU to the second RU, based on the received DU communication channel information from the second DU.

10. The host agent device of claim 3, wherein the controller is configured to:

receive RU communication capability information by being configured to receive a first frequency band having a plurality of component carriers from a first RU of the one or more RUs as part of the total RU communication capability;

receive DU communication channel information by being configured to:

receive a first portion of the plurality of component carriers for a first DU of the at least one DU, based on the one or more subsets of the total RU communication capability assigned to the one or more DUs; and receive a second portion of the plurality of component carriers for a second DU of the at least one DU, based on the one or more subsets of the total RU communication capability assigned to the one or more DUs; and map channel routing by being configured to:

map the first portion of the plurality of component carriers for the first DU to the first RU, based on the received DU communication channel information from the first DU; and map the second portion of the plurality of component carriers for the second DU to the first RU, based on the received DU communication channel information from the second DU.

11. The host agent device of claim 1, wherein the controller is further configured not to communicate an RU communication capability of the total RU communication capability to the one or more DUs greater than the total RU communication capability.

12. The host agent device of claim 1, wherein the RU communication capability information is comprised from the group consisting of: transmit power, a supported communication band, a component carrier bandwidth, and a modulation type.

13. The host agent device of claim 1, wherein:

the one or more RUs comprises a first RU cluster comprising one or more first RUs and a second RU cluster comprising one or more second RUs;

the controller configured to:

discover the presence of at least one first RU of the one or more first RUs in the first RU cluster and at least one second RU of the one or more second RUs in the second RU cluster;

receive RU communication capability information for the at least one first RU in the first RU cluster and the at least one second RU in the second RU cluster;

determine a total RU communication capability for the one or more first RUs and the one or more second RUs; and assign one or more subsets of the total RU communication capability for the first RU cluster to at least one first DU of the one or more DUs and the second RU cluster to at least one second DU of the one or more DUs.

14. The neutral host agent device of claim 13 further configured to:

receive DU communication channel information for the least one first DU and the at least one second DU, based on the one or more subsets of the total RU communications capability assigned to the respective at least one first DU and the at least one second DU.

15. The neutral host agent device of claim 14 further configured to:

map channel routing for the at least one first DU to the first RU cluster and the at least one second DU to the second RU cluster, based on the received DU communication channel information for the respective at least one first DU and the at least one second DU.

16. The neutral host agent device of claim 15 further configured to:

communicate at least one communication channel configuration to the first RU cluster and the second RU cluster based on map channel routing, for communication between the first RU cluster and the least one first DU, and the second RU cluster and the at least one second DU.

17. The host agent device of claim 1, wherein the controller is further configured to:

receive RU management information for the one or more RUs; and communicate the RU management information for the one or more RUs, to the least one DU.

18. The host agent device of claim 1, wherein the controller is further configured to communicate a software update to the one or more RUs.

19. The host agent device of claim 1, wherein the one or more RUs comprise one or more O-RUs, the plurality of DUs comprises a plurality of O-DUs, and the one or more RANs comprise one or more O-RANs.

20. The host agent device of claim 16, wherein the controller is configured to:

communicate the assigned one or more subsets of the total RU communication capability to the at least one DU by being configured to communicate at least one of O-RAN control plane and O-RAN user plane communication routing information to the at least one DU; and communicate the at least one communication channel configuration to the one or more RUs, by being configured to communicate at least one of O-RAN control plane and O-RAN user plane communication routing information to the one or more RUs, based on map channel routing, for communication between the one or more RUs and the at least one DU.

21. The host agent device of claim 1, wherein the controller configured to:

discover the presence of the one or more RUs by establishing a first communication session for the one or more RUs;

receive the RU communication capability information in the first communication session for the one or more RUs;

determine the total RU communication capability for the one or more RUs based on the received RU communication capability information for the one or more RUs;

communicate the assigned one or more subsets of the total RU communication capability to at least one DU, in a third communications session for the at least one DU;

receive the DU communication channel information in the third communication session for the least one DU, based on the assigned or more subsets of the total RU communication capability to the least one DU; and communicate, in a fourth communication session, the at least one communication channel configuration to the one or more RUs based on map channel routing, for communication between the one or more RUs and the at least one DU.

22. The neutral host agent device of claim 1, wherein the controller is further configured to discover the presence of the at least one DU of the one or more DUs.

23. A method of coupling a plurality of distribution units (DUs) in one or more respective radio access networks (RANs) to at least one shared remote unit (RU) of one or more RUs, comprising:

discovering the presence of the one or more RUs;

receiving RU communication capability information for the one or more RUs;

determining a total RU communication capability based on the received RU communication capability information for the one or more RUs;

assigning one or more subsets of the total RU communication capability to at least one DU of the one or more DUs; and communicating the assigned one or more subsets of the total RU communication capability to the at least one DU.

24. The method of claim 23, further comprising:

receiving DU communication channel information for the at least one DU, based on the one or more subsets of the total RU communication capability assigned to the at least one DU.

25. The method of claim 24, further comprising:

mapping channel routing for the at least one DU based on the received DU communication channel information for the at least one DU.

26. The method of claim 25, further comprising:

communicating at least one communication channel configuration to the one or more RUs based on map channel routing for communication between the one or more RUs and the at least one DU.

* * * * *